US012425405B2

(12) United States Patent
Ramach et al.

(10) Patent No.: US 12,425,405 B2
(45) Date of Patent: Sep. 23, 2025

(54) SECURE ACCESS SERVICE EDGE (SASE) SCRIPTLETS FOR PROVIDING SASE-BASED NETWORK SERVICES

(71) Applicant: Level 3 Communications, LLC, Denver, CO (US)

(72) Inventors: Mark Alan Ramach, Seattle, WA (US); Gurpreet S. Sidhu, Aurora, CO (US); Priyadarshini Dande, Thornton, CO (US); Michael F. Robles, Arvada, CO (US)

(73) Assignee: Level 3 Communications, LLC, Denver, CO (US)

( * ) Notice: Subject to any disclaimer, the term of this patent is extended or adjusted under 35 U.S.C. 154(b) by 0 days.

(21) Appl. No.: 18/626,453

(22) Filed: Apr. 4, 2024

(65) Prior Publication Data

US 2024/0356922 A1 Oct. 24, 2024

Related U.S. Application Data

(60) Provisional application No. 63/496,787, filed on Apr. 18, 2023.

(51) Int. Cl.
*H04L 9/40* (2022.01)
*G06Q 30/01* (2023.01)
*H04L 67/02* (2022.01)

(52) U.S. Cl.
CPC .......... *H04L 63/10* (2013.01); *G06Q 30/01* (2013.01); *H04L 67/02* (2013.01)

(58) Field of Classification Search
None
See application file for complete search history.

(56) References Cited

U.S. PATENT DOCUMENTS

| 12,284,197 B1 * | 4/2025 | Martin | H04L 67/306 |
| 2022/0103579 A1 * | 3/2022 | Shi | H04L 63/0281 |
| 2022/0261276 A1 | 8/2022 | Starr | |

(Continued)

OTHER PUBLICATIONS

International Search Report and Written Opinion of the International Searching Authority, dated Jul. 18, 2024, Int'l Appl. No. PCT/US2024/022934, Int'l Filing Date Apr. 4, 2024; 14 pgs.

(Continued)

*Primary Examiner* — Quang N Nguyen

(57) ABSTRACT

Novel tools and techniques are provided for implementing network service ordering and provisioning of secure access service edge ("SASE") scriptlets for providing SASE-based network. In various embodiments, a computing system may provide a user experience ("UX") platform for a customer portal, the UX platform being accessible by a user via a user device over a first network(s); may provide, via the UX platform, options to configure, via the customer portal, one or more SASE scriptlets for providing SASE-based network services provided by a service provider; and may autonomously orchestrate deployment and configuration of the one or more SASE scriptlets on one or more network devices that are associated with the user or to an entity with which the user is associated, over a second network(s), based at least in part on user selection of options to configure the one or more SASE scriptlets and/or the corresponding SASE-based network services.

20 Claims, 9 Drawing Sheets

(56) References Cited

U.S. PATENT DOCUMENTS

| | | | | |
|---|---|---|---|---|
| 2023/0085513 A1* | 3/2023 | Mestery | ............... | H04L 61/103 |
| | | | | 709/219 |
| 2023/0318964 A1* | 10/2023 | Kolar | ................... | H04L 45/123 |
| | | | | 709/238 |
| 2023/0327971 A1* | 10/2023 | Kolar | ..................... | H04L 43/12 |
| | | | | 709/224 |
| 2023/0403282 A1 | 12/2023 | Smith | | |
| 2024/0146727 A1* | 5/2024 | Jeuk | ..................... | H04L 63/105 |

OTHER PUBLICATIONS

Anonymous, "Secure access service edge", *Wikipedia* retrieved from the Internet: https://en.wikipedia.org/w/index.php?title=Secure_access_service_edge&oldid=1139101613, retrieved on Aug. 2, 2024; XP093181182, Feb. 13, 2023, 7 pgs.

Anonymous, "Secure Access Service Edge (SASE) At-a-Glance", retrieved from the Internet Jul. 2, 20242; https://www.cisco.com/c/en/us/products/collateral/security/at-a-gland-c45-2391315.html, XP093181202, Apr. 23, 2021, 7 pgs.

* cited by examiner

SECURE ACCESS SERVICE EDGE (SASE) SCRIPTLETS FOR PROVIDING SASE-BASED NETWORK SERVICES

CROSS-REFERENCES TO RELATED APPLICATIONS

This application claims the benefit of U.S. Provisional Application No. 63/496,787 (the "'787 Application"), filed Apr. 18, 2023, entitled, "Secure Access Service Edge (SASE) Scriptlets for Providing SASE-Based Network Services," which is incorporated herein by reference in its entirety.

This application may also be related to U.S. patent application Ser. No. 18/302,245 (the "'245 Application"), filed Apr. 18, 2023, entitled, "Secure Access Service Edge (SASE)," which claims priority to U.S. Provisional Application Ser. No. 63/351,612 (the "'612 Application"), filed Jun. 13, 2022, by Christopher D. Smith et al., "Secure Access Service Edge (SASE)," and U.S. Provisional Application Ser. No. 63/401,461 (the "'461 Application"), filed Aug. 26, 2022, by Christopher D. Smith et al. "Secure Access Service Edge (SASE)," the disclosure of each of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing network service ordering and provisioning, and, particularly, to methods, systems, and apparatuses for implementing network service ordering and provisioning of secure access service edge ("SASE") services or software packages, and, more particularly, to methods, systems, and apparatuses for implementing SASE scriptlets for providing SASE-based network services.

BACKGROUND

Secure access service edge ("SASE") recently proposed by Gartner, Inc., promises benefits from future implementation. Although some companies have begun to implement some of the ideas underlying Gartner's SASE to address issues with conventional siloed network solutions, such nascent attempts fail to provide customers with the ability to purchase SASE-based network services nor the ability to preconfigure such SASE-based network services, and fail to enable autonomous deployment of such preconfigured SASE-based network services. Conventional solutions also do not provide "in-app" ordering, configuration, and deployment of SASE scriptlets for providing SASE-based network services. It is with respect to this general technical environment to which aspects of the present disclosure are directed.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n" may be used, where n denotes any suitable integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 105a-105n, the integer value of n in 105n may be the same or different from the integer value of n in 110n for component #2 110a-110n, and so on.

DETAILED DESCRIPTION OF CERTAIN EMBODIMENTS

Overview

Figure 1:
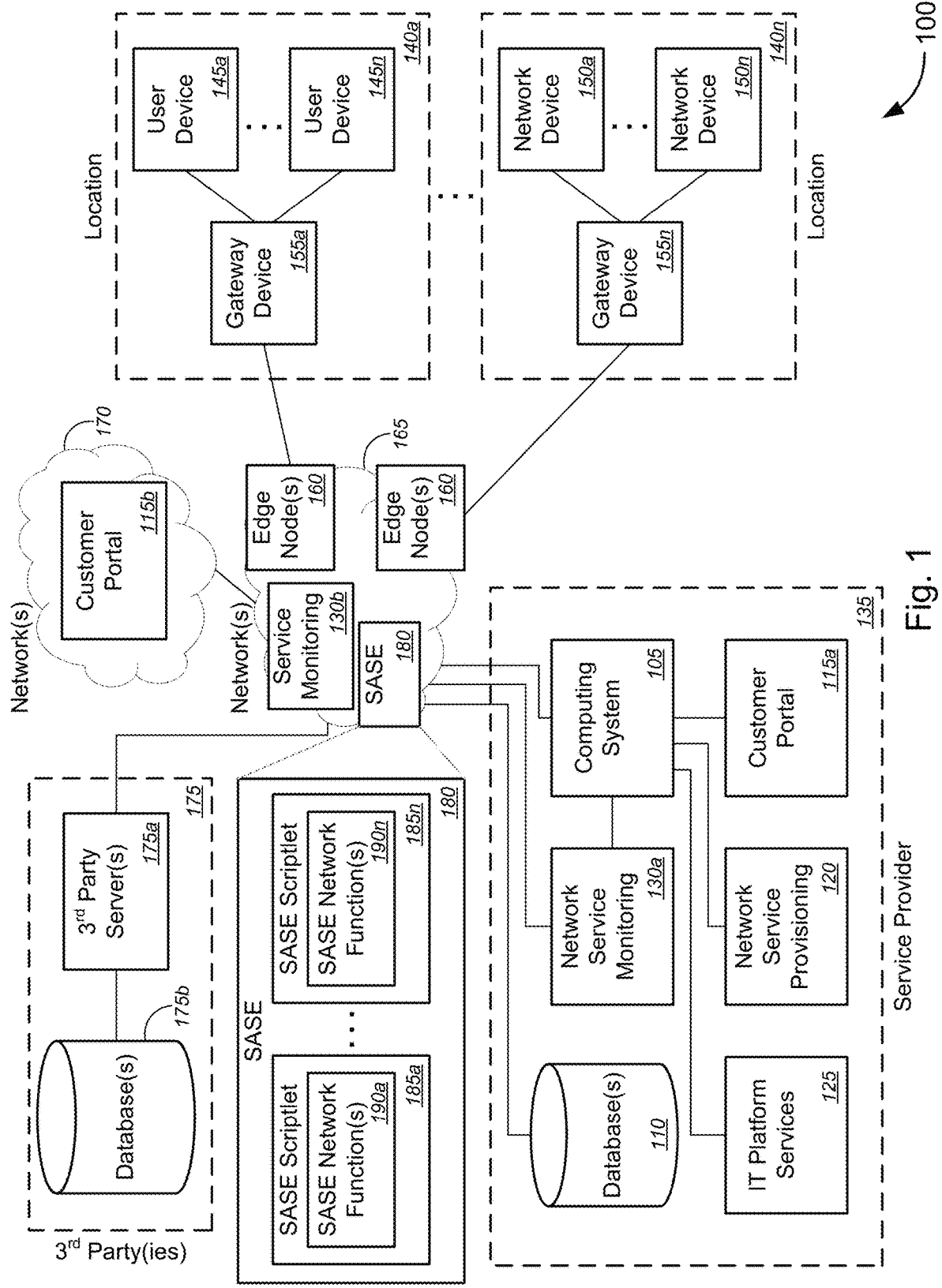
FIG. 1 is a schematic diagram illustrating a system for implementing a customer portal for providing a user experience ("UX") for customers to order and configure secure access service edge ("SASE") scriptlets for providing SASE-based network services that are subsequently autonomously provisioned via a network(s) and autonomously configured, in accordance with various embodiments.

Various embodiments provide tools and techniques for implementing network service ordering and provisioning of secure access service edge ("SASE") scriptlets for providing SASE-based network services.

In various embodiments, a customer portal is provided for providing a UX for customers to order and configure SASE scriptlets for providing SASE-based network services that are subsequently autonomously provisioned via a network(s), in some cases, autonomously deploying, on one or more network devices. In some embodiments, a SASE manager may configure such SASE scriptlets and/or SASE-based network services as part of in-app ordering, configuration, and deployment of SASE scriptlets for providing SASE-based network services, or the like.

These and other aspects of the network service ordering and provisioning of secure access service edge ("SASE") scriptlets for providing SASE-based network services are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a method may comprise providing, by a computing system, a user experience ("UX") platform, the UX platform being accessible, via a customer portal and over one or more first networks, by a user using a user device; providing, by the computing system and via the UX platform, one or more first options to select a secure access service edge ("SASE") scriptlet among a plurality of SASE scriptlets provided by one or more service providers, each SASE scriptlet being a software code that when executed is used to perform at least one specific SASE-based network function among a plurality of SASE-based network functions; in response to receiving user selection of an option among the one or more first options to select a first SASE scriptlet among the plurality of SASE scriptlets, providing, by the computing system and via the UX platform, one or more second options to configure the first SASE scriptlet and one or more third options to select at least one location for implementing a first SASE-based network function associated with the first SASE scriptlet; and autonomously orchestrating, by the computing system, deployment and configuration of the first SASE scriptlet on one or more network devices located at selected one or more locations, based at least in part on user selection of at least one option among the one or more second options to configure the first SASE scriptlet and on user selection of at least one option among the one or more third options to select the one or more locations.

In some embodiments, the computing system may comprise at least one of a web-based digital marketplace computing system, a portal-based digital marketplace computing system, a software application ("app")-based digital marketplace computing system, a server computer, a customer interface server, a network service reservation and ordering platform server, a gateway controller, a network provisioning server, a cloud computing system, or a distributed computing system, and/or the like.

According to some embodiments, the plurality of SASE-based network functions may be part of a plurality of SASE-based network services that collectively comprises a set of unified, cloud-based services that integrate software-defined wide area network ("SD-WAN") functionalities with network service functionalities and network security functionalities. In some examples, the method may further comprise providing, by the computing system and via the UX platform, one or more fourth options for the user to manage at least one of one or more SASE scriptlets among the plurality of SASE scriptlets or one or more SASE-based network services among the plurality of SASE-based network services.

In some cases, the one or more fourth options may comprise at least one of: one or more options to change at least one of deployment, configuration, settings, location, or operation of at least one of one or more SASE scriptlets among the plurality of SASE scriptlets or one or more SASE-based network functions associated with the corresponding one or more SASE scriptlets; one or more options to provide, update, or customize at least one of configuration information or policies for one or more of deployment, configuration, or operation of at least one of one or more SASE scriptlets among the plurality of SASE scriptlets or one or more SASE-based network functions associated with the corresponding one or more SASE scriptlets; one or more options to view at least one of one or more metrics, one or more operations, one or more overviews, one or more summaries, one or more reports, one or more performance alerts, one or more trouble tickets, one or more insights, or one or more dashboard features associated with at least one of one or more SASE scriptlets among the plurality of SASE scriptlets or one or more SASE-based network functions associated with the corresponding one or more SASE scriptlets; one or more options to view at least one of a dashboard or a network map that presents an overlay of at least one of one or more SASE scriptlets among the plurality of SASE scriptlets or one or more SASE-based network functions associated with the corresponding one or more SASE scriptlets being deployed on a plurality of network devices associated with the user or an entity with which the user is associated, regardless of platform or third party service providers that provide the one or more SASE scriptlets; one or more options to provide the user with curated access to one or more platforms or one or more portals of third party service providers that provide one or more second SASE scriptlets that have been deployed at least one network device associated with the user or the entity; or one or more options to purchase and configure additional SASE scriptlets among the plurality of SASE scriptlets; and/or the like. In some instances, the one or more options to purchase and configure additional SASE-based network services may be selected, tailored, and presented to the user based on tracking of transaction history or interest of the user, the entity, or an industry in which the user or the entity belongs.

In some embodiments, providing the one or more first options to select a SASE scriptlet among the plurality of SASE scriptlets may comprise presenting, by the computing system and via the UX platform, one or more application ("app") tiles within a display field of the UX platform, each app tile corresponding to one of the plurality of SASE scriptlets, the app tiles being arranged in one of a horizontal list of SASE scriptlets, a vertical list of SASE scriptlets, or a grid-array of SASE scriptlets; and/or the like.

Merely by way of example, in some cases, the plurality of SASE scriptlets may comprise at least one of a SASE scriptlet for deploying a firewall ("FW") at one or more network sites, a SASE scriptlet for configuring a FW at one or more network sites, a SASE scriptlet for deploying and configuring a FW at one or more network sites, a SASE scriptlet for creating and applying a port firewall rule to one or more network sites, a SASE scriptlet for creating and applying a network address translation ("NAT") firewall rule to one or more network sites, a SASE scriptlet for configuring one or more network sites as a software defined wide area network ("SDWAN"), a SASE scriptlet for configuring one or more network sites as a hub of a SDWAN, a SASE scriptlet for configuring one or more network sites as a spoke of a SDWAN, a SASE scriptlet for configuring one or more network sites for SDWAN hub and spoke topology, a SASE scriptlet for configuring one or more network sites as zero trust network access ("ZTNA") gateways, a SASE scriptlet for creating and applying a static route policy for one or more ZTNA gateways, a SASE scriptlet for configuring one or more network sites to enable multicast forwarding functionality, a SASE scriptlet for configuring one or more network sites with rapid threat defense ("RTD") security functionality, a SASE scriptlet for connecting a point-of-service ("POS") device to one or more network sites, a SASE scriptlet for connecting one or more user devices to one or more network sites, or a SASE scriptlet for configuring one or more user devices with direct Internet access ("DIA") functionality; and/or the like.

According to some embodiments, the one or more network devices may each be associated with at least one of the user, an entity with which the user is associated, or a service provider among the one or more service providers that is providing network services to the user or the entity. In such cases, the one or more network devices may comprise at least one of one or more servers, one or more network nodes, one or more network edge devices, or one or more customer premises equipment ("CPE"), and/or the like.

In some cases, the selected one or more locations may comprise a customer premises. Each of the one or more CPE may be located at the customer premises, the customer premises comprising one of a residential customer premises, a business customer premises, a corporate customer premises, an enterprise customer premises, an education facility customer premises, a medical facility customer premises, or a governmental customer premises, and/or the like. In some examples, the user selection of the at least one option among the one or more second options to configure the first SASE scriptlet may comprise user selection of options to configure the first SASE scriptlet with at least one configuration among a plurality of configurations of one or more SASE-based network services to enable the first SASE scriptlet to perform the first SASE-based network function and/or to configure the first SASE scriptlet, when executed on each of the one or more CPE, to configure each of the one or more CPE with the at least one configuration to perform the first SASE-based network function. In some instances, deployment and configuration of the first SASE scriptlet may comprise performing at least one of: configuring the first SASE scriptlet, when executed on a CPE among the one or more CPE, to configure the CPE with at least one configuration among a plurality of configurations of one or more SASE-based network services to perform the first SASE-based network function; pushing the first SASE scriptlet onto the CPE and installing the first SASE scriptlet on the CPE; or in response to executing the first SASE scriptlet, which has been configured and installed on the CPE, configuring the CPE with the at least one configuration to perform the first SASE-based network function; and/or the like.

Alternatively, the selected one or more locations may comprise one or more second networks. At least one of the one or more servers, the one or more network nodes, or the one or more network edge devices may be located within the one or more second networks. In some instances, at least one of the one or more second networks may be the same network as at least one of the one or more first networks. In some examples, the user selection of the at least one option among the one or more second options to configure the first SASE scriptlet may comprise user selection of options to configure the first SASE scriptlet with at least one configuration among a plurality of configurations of one or more SASE-based network services to enable the first SASE scriptlet to perform the first SASE-based network function and/or to configure the first SASE scriptlet, when executed on each of the one or more network devices, to configure each of the one or more network devices with the at least one configuration to perform the first SASE-based network function. In some cases, deployment and configuration of the first SASE scriptlet may comprise performing at least one of: configuring the first SASE scriptlet, when executed on a network device among the one or more network devices, to configure the network device with at least one configuration among a plurality of configurations of one or more SASE-based network services to perform the first SASE-based network function; pushing the first SASE scriptlet onto the network device and installing the first SASE scriptlet on the network device; or in response to executing the first SASE scriptlet, which has been preconfigured and installed on the network device, configuring the network device with the at least one configuration to perform the first SASE-based network function; and/or the like.

In some embodiments, the user selection of the at least one option among the one or more second options to configure the first SASE scriptlet may further comprise user selection of one or more fifth options for executing the first SASE scriptlet, the one or more fifth options comprising one of: one or more options for automatically executing the first SASE scriptlet immediately after deployment and configuration of the first SASE scriptlet have been completed; one or more options for scheduling automatic execution of the first SASE scriptlet, which has been deployed and configured, during a maintenance period; or one or more options for manually reviewing, configuring, and executing the first SASE scriptlet; and/or the like.

According to some embodiments, the method may further comprise collecting, by the computing system, network usage data from the one or more network devices. In some cases, autonomously orchestrating configuration of the first SASE scriptlet may be further performed based at least in part on analysis of the collected network usage data to optimize the first SASE-based network function associated with the first SASE scriptlet.

In another aspect, a system may comprise a computing system, which may comprise at least one first processor and a first non-transitory computer readable medium communicatively coupled to the at least one first processor. The first non-transitory computer readable medium may have stored thereon computer software comprising a first set of instructions that, when executed by the at least one first processor, causes the computing system to: provide a user experience ("UX") platform, the UX platform being accessible, via a customer portal and over one or more first networks, by a user using a user device; provide, via the UX platform, one or more first options to select a secure access service edge ("SASE") scriptlet among a plurality of SASE scriptlets provided by one or more service providers, each SASE scriptlet being a software code that when executed is used to perform at least one specific SASE-based network function among a plurality of SASE-based network functions; in response to receiving user selection of an option among the one or more first options to select a first SASE scriptlet among the plurality of SASE scriptlets, provide, via the UX platform, one or more second options to configure the first SASE scriptlet and one or more third options to select at least one location for implementing a first SASE-based network function associated with the first SASE scriptlet; and autonomously orchestrate deployment and configuration of the first SASE scriptlet on one or more network devices located at selected one or more locations, based at least in part on user selection of at least one option among the one or more second options to configure the first SASE scriptlet and on user selection of at least one option among the one or more third options to select the one or more locations.

In yet another aspect, a method may comprise autonomously orchestrating, by a secure access service edge ("SASE") manager, deployment and configuration of one or more SASE scriptlets on one or more network devices located at selected one or more locations, based at least in part on user selection of at least one option among one or more first options to select the one or more SASE scriptlets from among a plurality of SASE scriptlets, on user selection of at least one option among the one or more second options to configure the first SASE scriptlet and on user selection of at least one option among the one or more third options to select the one or more locations. In some cases, each SASE scriptlet may be a software code that when executed is used to perform at least one specific SASE-based network function among a plurality of SASE-based network functions. In some instances, the plurality of SASE-based network functions may be part of a plurality of SASE-based network services that collectively comprises a set of unified, cloud-based services that integrate software-defined wide area network ("SD-WAN") functionalities with network service functionalities and network security functionalities According to some embodiments, the plurality of SASE-based network services may be part of a plurality of network services further comprising at least one of a plurality of network service software applications ("apps"), one or more Internet services, one or more WAN services, one or more SD-WAN services, one or more network security services, one or more telephony services, one or more voice over Internet Protocol ("VoIP") services, or other network services, wherein the network service functionalities comprise at least one of WAN optimization functionalities, software-defined application-centric network control functionalities, data loss prevention ("DLP") functionalities, application performance management ("APM") functionalities, bandwidth aggregation functionalities, network as a service ("NaaS") functionalities, global private network functionalities, software as a service ("SaaS") functionalities, content distribution network ("CDN") functionalities, or multi-cloud networking functionalities, wherein the network security functionalities comprise at least one of firewall as a service ("FWaaS") functionalities, secure web gateway ("SWG") functionalities, zero-trust network access ("ZTNA") functionalities, anti-malware functionalities, intrusion detection functionalities, intrusion prevention functionalities, cloud access security broker ("CASB") functionalities, remote browser isolation ("RBI") functionalities, web application and application programming interface ("API") protection ("WAAP") functionalities, secure sockets layer ("SSL") or transport layer security ("TLS") inspection functionalities, or network-based threat detection functionalities; and/or the like.

In some embodiments, the plurality of SASE scriptlets may comprise at least one of a SASE scriptlet for deploying a firewall ("FW") at one or more network sites, a SASE scriptlet for configuring a FW at one or more network sites, a SASE scriptlet for deploying and configuring a FW at one or more network sites, a SASE scriptlet for creating and applying a port firewall rule to one or more network sites, a SASE scriptlet for creating and applying a network address translation ("NAT") firewall rule to one or more network sites, a SASE scriptlet for configuring one or more network sites as a software defined wide area network ("SDWAN"), a SASE scriptlet for configuring one or more network sites as a hub of a SDWAN, a SASE scriptlet for configuring one or more network sites as a spoke of a SDWAN, a SASE scriptlet for configuring one or more network sites for SDWAN hub and spoke topology, a SASE scriptlet for configuring one or more network sites as zero trust network access ("ZTNA") gateways, a SASE scriptlet for creating and applying a static route policy for one or more ZTNA gateways, a SASE scriptlet for configuring one or more network sites to enable multicast forwarding functionality, a SASE scriptlet for configuring one or more network sites with rapid threat defense ("RTD") security functionality, a SASE scriptlet for connecting a point-of-service ("POS") device to one or more network sites, a SASE scriptlet for connecting one or more user devices to one or more network sites, or a SASE scriptlet for configuring one or more user devices with direct Internet access ("DIA") functionality; and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

Specific Exemplary Embodiments

We now turn to the embodiments as illustrated by the drawings. FIGS. 1-6 illustrate some of the features of the method, system, and apparatus for implementing network service ordering and provisioning of secure access service edge ("SASE") scriptlets for providing SASE-based network services, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

FIG. 1 is a schematic diagram illustrating a system 100 for implementing a customer portal for providing a user experience ("UX") for customers to order and configure secure access service edge ("SASE") scriptlets for providing SASE-based network services that are subsequently autonomously provisioned via a network(s) and autonomously configured, in accordance with various embodiments.

In the non-limiting embodiment of FIG. 1, system 100 may comprise computing system 105, database(s) 110, customer portal 115a, network service provisioning system 120, IT platform services 125, and network service monitoring system 130a, each associated with a service provider 135. In some embodiments, disposed within locations 140a-140n (collectively, "locations 140" or the like), each associated with a customer or user, may be one or more user devices 145a-145n (collectively, "user devices 145" or the like) and/or one or more network devices 150a-150n (collectively, "network devices 150" or the like), each communicatively coupled to one of gateway devices 155a-155n (collectively, "gateway devices 155" or the like). System 100 may further comprise one or more edge nodes 160 disposed in one or more networks 165, which may be operated or provided by service provider 135 or a different service provider (not shown). According to some embodiments, alternative or additional to customer portal 115a, system 100 may (further) comprise customer portal 115b disposed within network(s) 170, which may be associated with a different service provider compared with the service provider 135 and/or the service provider for operating or providing the one or more networks 165.

In some embodiments, system 100 may further comprise one or more third parties 175, each with corresponding third party server(s) 175a and corresponding database(s) 175b. The one or more third parties 175 may provide software applications, SASE scriptlets, or other services for customers to purchase on the customer portal 115a and/or 115b.

System 100 may further comprise SASE system or one or more SASE-based network services 180, the one or more SASE-based network services 180 collectively including a set of unified, cloud-based services that integrate software-defined wide area network ("SD-WAN") functionalities with network service functionalities and network security functionalities. In some embodiments, the SASE system or the one or more SASE-based network services 180 may include, without limitation, one or more SASE scriptlets 185a-185n (collectively, "SASE scriptlets 185" or the like), each SASE scriptlet 185 being a software code that when executed is used to perform at least one specific SASE-based network function among a plurality of SASE-based network functions 190a-190n (collectively, "SASE-based network functions 190" or the like).

In some embodiments, the computing system 105 may include, without limitation, at least one of a web-based digital marketplace computing system, a portal-based digital marketplace computing system, a software application ("app")-based digital marketplace computing system, a server computer, a customer interface server, a network service reservation and ordering platform server, a gateway controller, a network provisioning server, a cloud computing system, or a distributed computing system, and/or the like. In some cases, the one or more user devices 145a-145n may each include, but is not limited to, one of a desktop computer, a laptop computer, a tablet computer, a smart phone, or a mobile phone, and/or the like. In some instances, the one or more network devices 150a-150n may each include, without limitation, one of a customer premises equipment ("CPE"), a universal CPE ("uCPE"), a server, a network node, or a network edge device, or the like. In some examples, the one or more user devices 145 and/or the one or more network devices 150 may each further include, but is not limited to, any suitable device capable of communicating with one or more of computing system 105, customer portal 115a or 115b, edge node 160, and/or SASE system 180, or the like, via a web-based portal, an API, a server, an app, or any other suitable communications interface, or the like, over network(s) 165 and/or 170 via gateway device 155, and the like, and/or any suitable device capable of running, executing, or implementing SASE scriptlets (such as SASE scriptlets 185a-185n, or the like) and/or performing corresponding SASE-based network functions (e.g., SASE-based network functions 190a-190n, or the like), and the like. In some instances, the locations 140a-140n may each include, without limitation, at least one of a customer premises, a residential customer premises, a business customer premises, a corporate customer premises, an enterprise customer premises, an education facility customer premises, a medical facility customer premises, a governmental customer premises, a business facility, a corporate facility, an enterprise facility, an education facility, a medical facility, or a governmental facility, and/or the like.

In some instances, the plurality of SASE-based network services 180 may be part of a plurality of network services further including, but not limited to, at least one of a plurality of network service software applications ("apps"), one or more Internet services, one or more WAN services, one or more SD-WAN services, one or more network security services, one or more telephony services, one or more voice over Internet Protocol ("VoIP") services, or other network services, and/or the like. In some cases, the network service functionalities may include, without limitation, at least one of WAN optimization functionalities, software-defined application-centric network control functionalities, data loss prevention ("DLP") functionalities (which may be used to inspect data sent via messaging applications, in motion over the network, in use on a managed endpoint device, and/or at rest in on-premises file servers or in cloud applications and cloud storage, or the like), application performance management ("APM") functionalities (which may be used to identify application performance issues and/or to maintain an expected level of service, or the like), bandwidth aggregation functionalities, network as a service ("NaaS") functionalities, global private network functionalities, software as a service ("SaaS") functionalities, content distribution network ("CDN") functionalities, or multicloud networking functionalities, and/or the like.

In some examples, the network security functionalities may include, but are not limited to, at least one of firewall as a service ("FWaaS") functionalities (which may provide virtualized firewall services in the cloud, or the like), secure web gateway ("SWG") functionalities (which may provide secure access to popular SaaS and web service, or the like), zero-trust network access ("ZTNA") functionalities (which may provide network access for work from anywhere security implementation, or the like), anti-malware functionalities, intrusion detection functionalities (which may be used to monitor network events and to analyze them for signs of incidents, violations, and/or threats to customer security policies, or the like), intrusion prevention functionalities (which may be used to detect incidents and to stop detected incidents, or the like), cloud access security broker ("CASB") functionalities (which may be used to address permissions and use for cloud applications, or the like), remote browser isolation ("RBI") functionalities (which may be used to separate a device from Internet browsing by hosting and running all browsing activity in a remote cloud-based container to isolate data, or the like), web application and application programming interface ("API") protection ("WAAP") functionalities (which may be specifically designed to protect web applications and APIs, or the like), secure sockets layer ("SSL") or transport layer security ("TLS") inspection functionalities (which may be used to intercept and review encrypted Internet communication between a client and a server, or the like), or network-based threat detection functionalities, and/or the like.

Merely by way of example, in some cases, the plurality of SASE scriptlets 185 may include, but is not limited to, at least one of a SASE scriptlet for deploying a firewall ("FW") at one or more network sites, a SASE scriptlet for configuring a FW at one or more network sites, a SASE scriptlet for deploying and configuring a FW at one or more network sites, a SASE scriptlet for creating and applying a port firewall rule to one or more network sites, a SASE scriptlet for creating and applying a network address translation ("NAT") firewall rule to one or more network sites, a SASE scriptlet for configuring one or more network sites as a SDWAN, a SASE scriptlet for configuring one or more network sites as a hub of a SDWAN, a SASE scriptlet for configuring one or more network sites as a spoke of a SDWAN, a SASE scriptlet for configuring one or more network sites for SDWAN hub and spoke topology, a SASE scriptlet for configuring one or more network sites as ZTNA gateways, a SASE scriptlet for creating and applying a static route policy for one or more ZTNA gateways, a SASE scriptlet for configuring one or more network sites to enable multicast forwarding functionality, a SASE scriptlet for configuring one or more network sites with rapid threat defense ("RTD") security functionality, a SASE scriptlet for connecting a point-of-service ("POS") device to one or more network sites, a SASE scriptlet for connecting one or more user devices to one or more network sites, or a SASE scriptlet for configuring one or more user devices with direct Internet access ("DIA") functionality; and/or the like.

In various embodiments, the one or more SASE-based network services utilize SD-WAN functionalities to achieve optimal WAN management by providing optimized network routing, optimized WAN and network security, optimized network connectivity, and optimized remote network access, in some cases, by using the software-defined nature of SD-WAN, which allows for immediate, real-time or near-real-time, changes in configuration of the SD-WAN without need for truck rolls or deployment of technicians, or the like. In some instances, FWaaS functionalities provide customized or customizable deployment of firewalls, thereby providing scalability and elasticity, while extending full network security throughout the network and/or to locations within the network as needed. In some cases, SWG functionalities may include, but are not limited to, filtering unwanted software or malware from user-initiated network traffic and enforcing corporate and regulatory policy compliance, and/or the like, in some cases, by utilizing at least one of uniform resource locator ("URL") filtering, malicious-code detection and filtering, application controls for popular Web-based applications (e.g., instant messaging ("IM") and Skype, or the like), native data leak prevention, or integrated data leak prevention, and/or the like.

In some instances, ZTNA functionalities enable dynamic adjustment of application or network service access by requiring verification of users' identities and establishment of device trust before providing users with access to authorized applications and/or network services, thereby preventing unauthorized access, containing potential breaches, and/or limiting lateral access within the network by malicious entities, and/or the like. In some instances, ZTNA functionalities may be based on such factors as user identity, location, device type, and/or the like. In some cases, CASB functionalities utilize either on-premises or cloud-based security policy enforcement points that are located between the users and network service providers, and are configured to combine and interject security policies (e.g., enterprise security policies) as network-based or cloud-based resources are accessed by the users. CASB functionalities may include consolidating multiple types of security policy enforcement, including, but not limited to, at least one of authentication, single sign-on, authorization, credential mapping, device profiling, encryption, tokenization, logging, alerting, malware detection, or malware prevention, and/or the like.

The one or more SASE-based network services—which are elastic, self-healing, and self-maintaining, and/or the like—may utilize unified management of these and other disparate network-based services, products, and/or functionalities, thereby enabling users to monitor and manage all network and security solutions from a single interface or portal (sometimes referred to as "a single pane of glass" or the like), in contrast with the traditionally delivered siloed point solutions that fail to integrate the disparate network and security solutions. In this manner, cost and complexity (in terms of network and security) may be reduced, centralized orchestration and real-time application optimization may be achieved, seamless access (including more secure remote and mobile access) for users may be provided, access may be restricted based on user, device, and/or application identity, consistent security policy may be applied to improve overall network security, and/or centralized management may be used to increase effectiveness of network and security staff, and/or the like.

According to some embodiments, network(s) 165 and/or 170 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 165 and/or 170 may include an access network of the service provider (e.g., an Internet service provider ("ISP")). In another embodiment, the network(s) 165 and/or 170 may include a core network of the service provider and/or the Internet.

In operation, the computing system 105, customer portal 115*a* and/or 115*b*, network service provisioning 120, IT platform services 125, network service monitoring 130*a* and/or 130*b* (collectively, "computing system" or the like) may perform methods for providing a UX for customers to order and configure SASE scriptlets for providing SASE-based network services that are subsequently autonomously provisioned via a network(s) and autonomously configured, in some cases, autonomously deploying and configuring, on user device(s) 145 and/or network device(s) 150 (e.g., CPE or other device, or the like) or gateway device(s) 155, purchased SASE-based network services or SASE scriptlets 185, as described in detail with respect to FIGS. 2-5. These and other functions of the system 100 (and its components) are described in greater detail below with respect to FIGS. 2-5.

Figure 2:
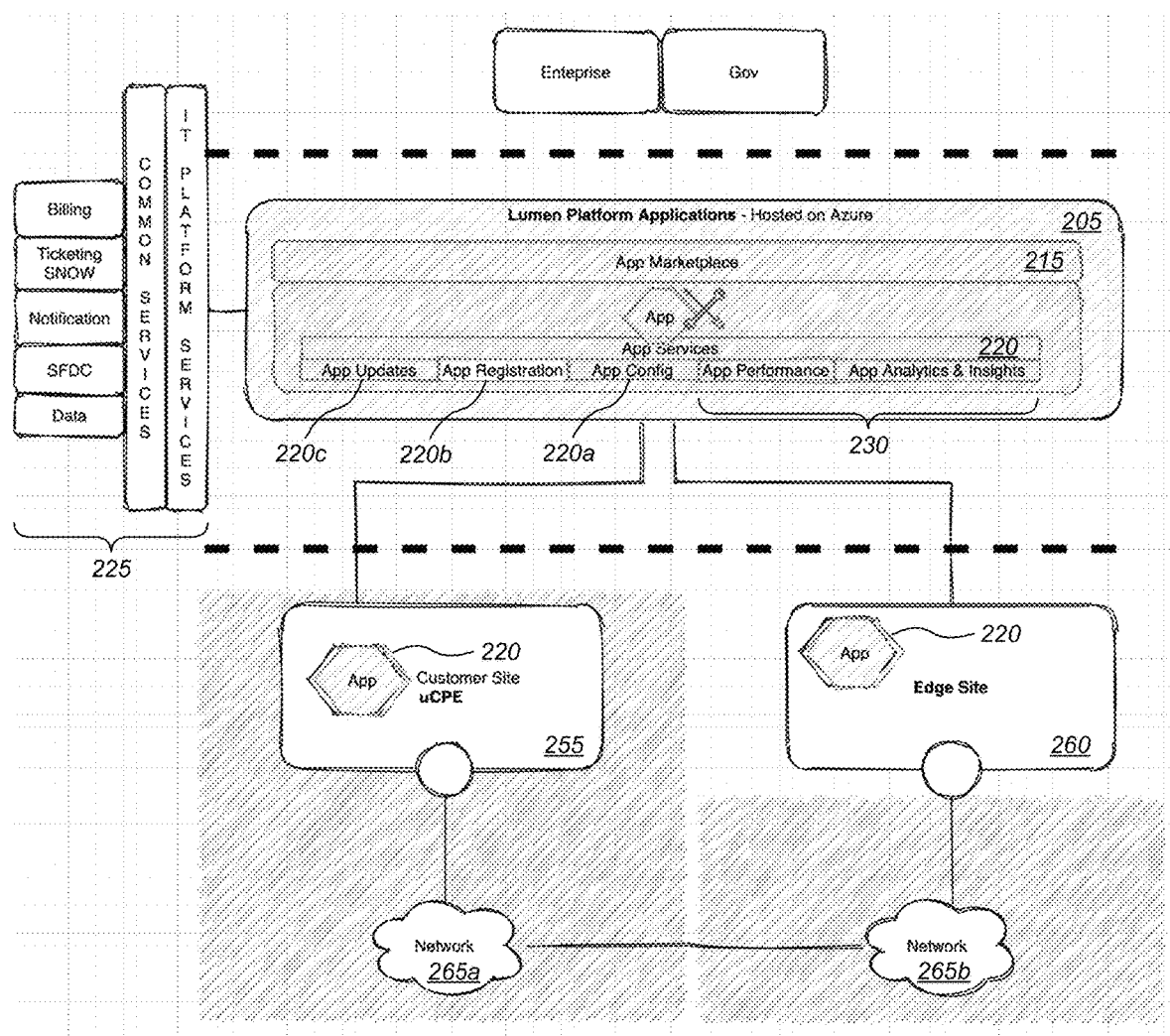
FIG. 2 is a schematic diagram illustrating a system for implementing a digital marketplace for providing a UX for customers to order and configure SASE scriptlets for providing SASE-based network services that are subsequently autonomously provisioned via a network(s) and autonomously configured, in accordance with various embodiments.

FIG. 2 is a schematic diagram illustrating a system 200 for implementing a digital marketplace for providing a UX for customers to order and configure SASE scriptlets for providing SASE-based network services that are subsequently autonomously provisioned via a network(s) and autonomously configured, in accordance with various embodiments. In some embodiments, network services may be embodied by network service software applications ("apps"), in some cases, SASE-based network service apps, or the like.

System 200 may comprise service provider platform applications or systems 205, digital marketplace 215, one or more app services 220, IT platform services 225 (including, but not limited to, common services, including, without limitation, billing services, ticketing services, notifications, SFDC systems, data systems, and/or the like), app performance and/or analytics and insights systems 230, uCPE (or customer premises) 255, edge node(s) (or edge node location) 260, and network(s) 265a-265b, and/or the like. In some cases, the app services 220 may include at least one of app configuration 220a, app registration 220b, and/or app updates 220c, and/or the like.

In some embodiments, service provider platform applications or systems 205, digital marketplace 215, IT platform services 225, app performance and/or analytics and insights systems 230, uCPE (or customer premises) 255, edge node (s) (or edge node location) 260, and network(s) 265a-265b of system 200 of FIG. 2 may correspond to computing system 105, customer portal 115a or 115b, IT platform services system 125, network service monitoring system 130a or 130b, gateway device 155a-155n (or locations 140a-140n), edge node(s) 160, and network(s) 165 and/or 170 of system 100 of FIG. 1, respectively, and the descriptions of these components of system 100 are applicable to the corresponding components of system 200, respectively.

These and other functions of the system 200 (and its components) are described in greater detail below with respect to FIGS. 1 and 3-5.

Figure 3:
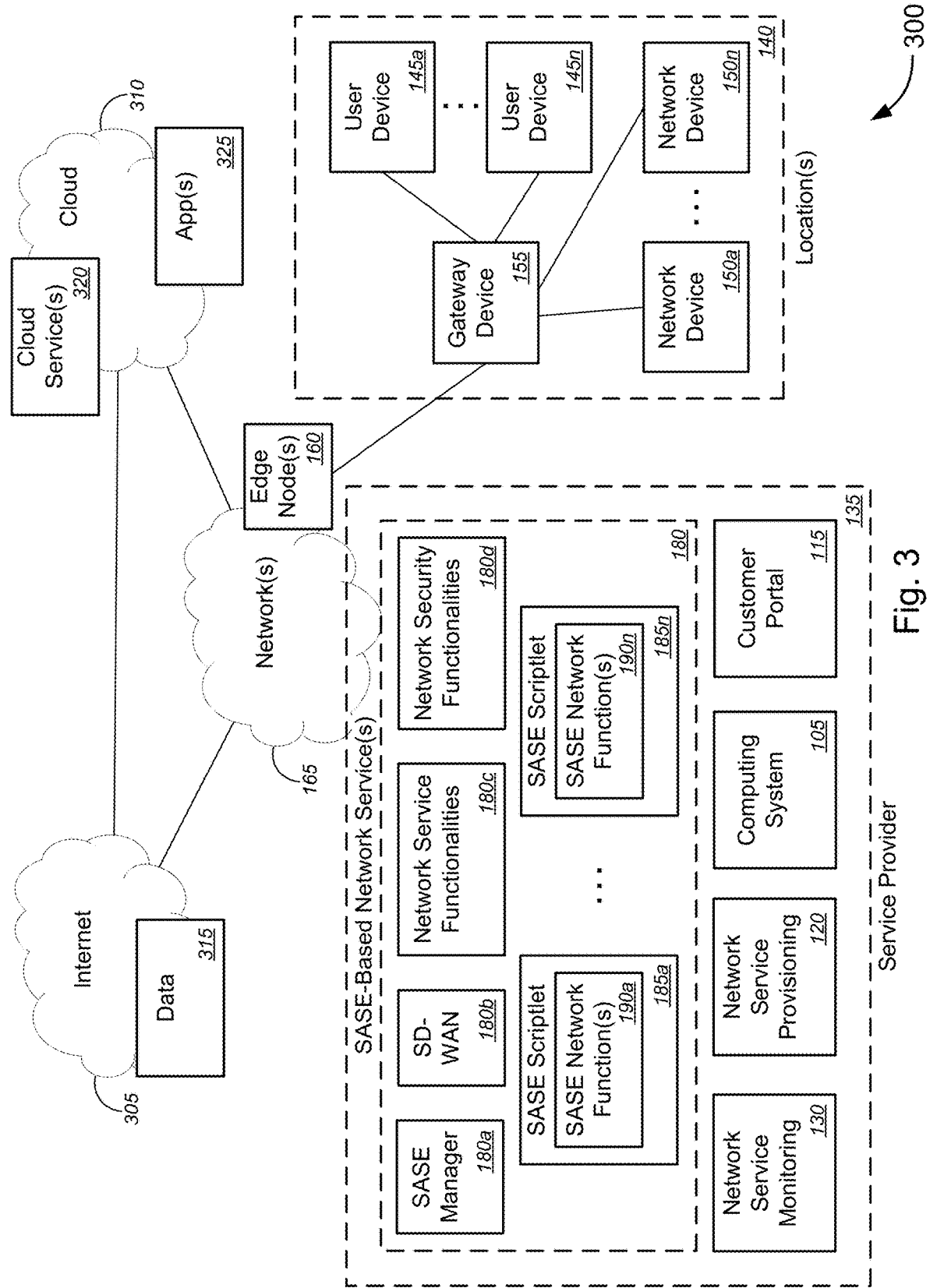
FIG. 3 is a schematic diagram illustrating a non-limiting example of provisioning and configuring SASE scriptlets for providing SASE-based network services, in accordance with various embodiments.

FIG. 3 is a schematic diagram illustrating a non-limiting example 300 of provisioning and configuring SASE scriptlets for providing SASE-based network services, in accordance with various embodiments.

Referring to the non-limiting example 300 of FIG. 3, SASE-based network service(s) (or SASE system) 180 may include a SASE manager 180a, and the SASE-based network service(s) 180 may be associated with a service provider 135 may collectively comprise a set of unified, cloud-based services that integrate software-defined wide area network ("SD-WAN") functionalities 180b with network service functionalities 180c and network security functionalities 180d. In some examples, SASE-based network service(s) (or SASE system) 180 may include, but is not limited to, one or more SASE scriptlets 185a-185n (collectively, "SASE scriptlets 185" or the like; similar to SASE scriptlets 185 of FIG. 1, or the like), each SASE scriptlet 185 being a software code that when executed is used to perform at least one specific SASE-based network function among a plurality of SASE-based network functions 190a-190n (collectively, "SASE-based network functions 190" or the like; similar to SASE-based network functions 190 of FIG. 1, or the like). In some cases, the network service functionalities 180c may include, without limitation, at least one of WAN optimization functionalities, software-defined application-centric network control functionalities, data loss prevention ("DLP") functionalities, application performance management ("APM") functionalities, bandwidth aggregation functionalities, network as a service ("NaaS") functionalities, global private network functionalities, software as a service ("SaaS") functionalities, content distribution network ("CDN") functionalities, or multi-cloud networking functionalities, and/or the like. In some instances, the network security functionalities 180d may include, but are not limited to, at least one of firewall as a service ("FWaaS") functionalities, secure web gateway ("SWG") functionalities, zero-trust network access ("ZTNA") functionalities, anti-malware functionalities, intrusion detection functionalities, intrusion prevention functionalities, cloud access security broker ("CASB") functionalities, remote browser isolation ("RBI") functionalities, web application and application programming interface ("API") protection ("WAAP") functionalities, secure sockets layer ("SSL") or transport layer security ("TLS") inspection functionalities, or network-based threat detection functionalities, and/or the like.

Merely by way of example, in some cases, the plurality of SASE scriptlets 185 may include, but is not limited to, at least one of a SASE scriptlet for deploying a firewall ("FW") at one or more network sites, a SASE scriptlet for configuring a FW at one or more network sites, a SASE scriptlet for deploying and configuring a FW at one or more network sites, a SASE scriptlet for creating and applying a port firewall rule to one or more network sites, a SASE scriptlet for creating and applying a network address translation ("NAT") firewall rule to one or more network sites, a SASE scriptlet for configuring one or more network sites as a SDWAN, a SASE scriptlet for configuring one or more network sites as a hub of a SDWAN, a SASE scriptlet for configuring one or more network sites as a spoke of a SDWAN, a SASE scriptlet for configuring one or more network sites for SDWAN hub and spoke topology, a SASE scriptlet for configuring one or more network sites as ZTNA gateways, a SASE scriptlet for creating and applying a static route policy for one or more ZTNA gateways, a SASE scriptlet for configuring one or more network sites to enable multicast forwarding functionality, a SASE scriptlet for configuring one or more network sites with rapid threat defense ("RTD") security functionality, a SASE scriptlet for connecting a point-of-service ("POS") device to one or more network sites, a SASE scriptlet for connecting one or more user devices to one or more network sites, or a SASE scriptlet for configuring one or more user devices with direct Internet access ("DIA") functionality; and/or the like.

The one or more SASE-based network services 180—which are elastic, self-healing, and self-maintaining, and/or the like—may utilize unified management of these and other disparate network-based services, products, and/or functionalities to provide the users with secure access to data 315, cloud services 320, and software applications ("apps") 325 over the Internet 305 and/or the cloud 310, thereby enabling users to monitor and manage all network and security solutions from a single interface or portal (sometimes referred to as "a single pane of glass" or the like), in contrast with the traditionally delivered siloed point solutions that fail to integrate the disparate network and security solutions.

As described herein with respect to FIGS. 1, 2, 4, and 5, the computing system 105, customer portal 115, network service provisioning 120, network service monitoring system 130 (collectively, "computing system" or the like) may perform methods for providing a UX for customers to order and configure SASE scriptlets for providing SASE-based network services that are subsequently autonomously provisioned via a network(s) (e.g., networks 165, 305, and 310, or the like, and/or edge node(s) 160, or the like) and autonomously configured, in some cases, autonomously deploying and configuring-on user device(s) 145, network device(s) 150 (e.g., CPE or other device, or the like), gateway device(s) 155, and/or edge node(s) 160—ordered or purchased SASE-based network services (e.g., network service functionalities 180c, network security functionalities 180d, and/or SASE network functions 190a-190n, or the like) or SASE scriptlets 185a-185n, as described in detail with respect to FIGS. 1, 2, 4, and 5 (or the '612 and '461 Applications, or the like, the disclosures of which have already been incorporated herein by reference in their entirety for all purposes).

In some aspects, SASE manager 180a may autonomously orchestrate deployment and configuration of one or more SASE scriptlets for providing SASE-based network services via one or more user devices 145 and/or network devices 150 that are associated with a user or to an entity with which the user is associated, over one or more networks, based at least in part on user selection of at least one option among one or more options to configure the one or more SASE-based network services and/or one or more SASE scriptlets for providing the SASE-based network services.

In some embodiments, in response to receiving user input or user request, the SASE manager 180a may perform at least one of: changing at least one of deployment, configuration, settings, location, or operation of at least one of one or more SASE scriptlets among the plurality of SASE scriptlets or one or more SASE-based network functions associated with the corresponding one or more SASE scriptlets; implementing one or more of deployment, configuration, or operation of at least one of one or more SASE scriptlets among the plurality of SASE scriptlets or one or more SASE-based network functions associated with the corresponding one or more SASE scriptlets based at least in part on at least one of configuration information or policies that have been provided, updated, or customized by the user; displaying, in a user interface, at least one of one or more metrics, one or more operations, one or more overviews, one or more summaries, one or more reports, one or more performance alerts, one or more trouble tickets, one or more insights, or one or more dashboard features associated with at least one of one or more SASE scriptlets among the plurality of SASE scriptlets or one or more SASE-based network functions associated with the corresponding one or more SASE scriptlets; providing the user with options, displayed in the user interface, to purchase and configure additional SASE scriptlets among the plurality of SASE scriptlets; displaying, in the user interface, at least one of a dashboard or a network map that presents an overlay of at least one of one or more SASE scriptlets among the plurality of SASE scriptlets or one or more SASE-based network functions associated with the corresponding one or more SASE scriptlets being deployed on devices associated with the user or an entity with which the user is associated, regardless of platform or third party service providers (or vendors) that provide the SASE-based network services or the SASE scriptlets over the one or more second networks [e.g., in a cross vendor, cross platform dashboard that presents an overlay of existing services, irrespective of vendor or platform, or the like]; or providing the user with curated access, in the user interface, to one or more platforms or one or more portals of third party service providers (or vendors) that provide one or more second SASE scriptlets that have been deployed on at least one network device associated with the user or the entity; and/or the like. For the latter two functionalities, the service provider may act as a managed services provider that manages the services provided by the third party vendors, and, in accordance with the various embodiments herein, may be able to provide a common platform to manage an integrated display interface for disparate systems provided by the service provider and each of the third party vendors.

According to some embodiments, SASE manager 180a may collect network usage data from user device(s) 145, network device(s) 150 (e.g., the one or more CPE or other device, or the like), gateway device(s) 155, and/or edge node(s) 160, and autonomously orchestrating configuration of the one or more SASE-based network services 180 and/or the one or more SASE scriptlets 185 may be further performed based at least in part on analysis of the collected network usage data to optimize the one or more SASE-based network services 180 and/or the one or more SASE scriptlets 185.

Figure 4A:
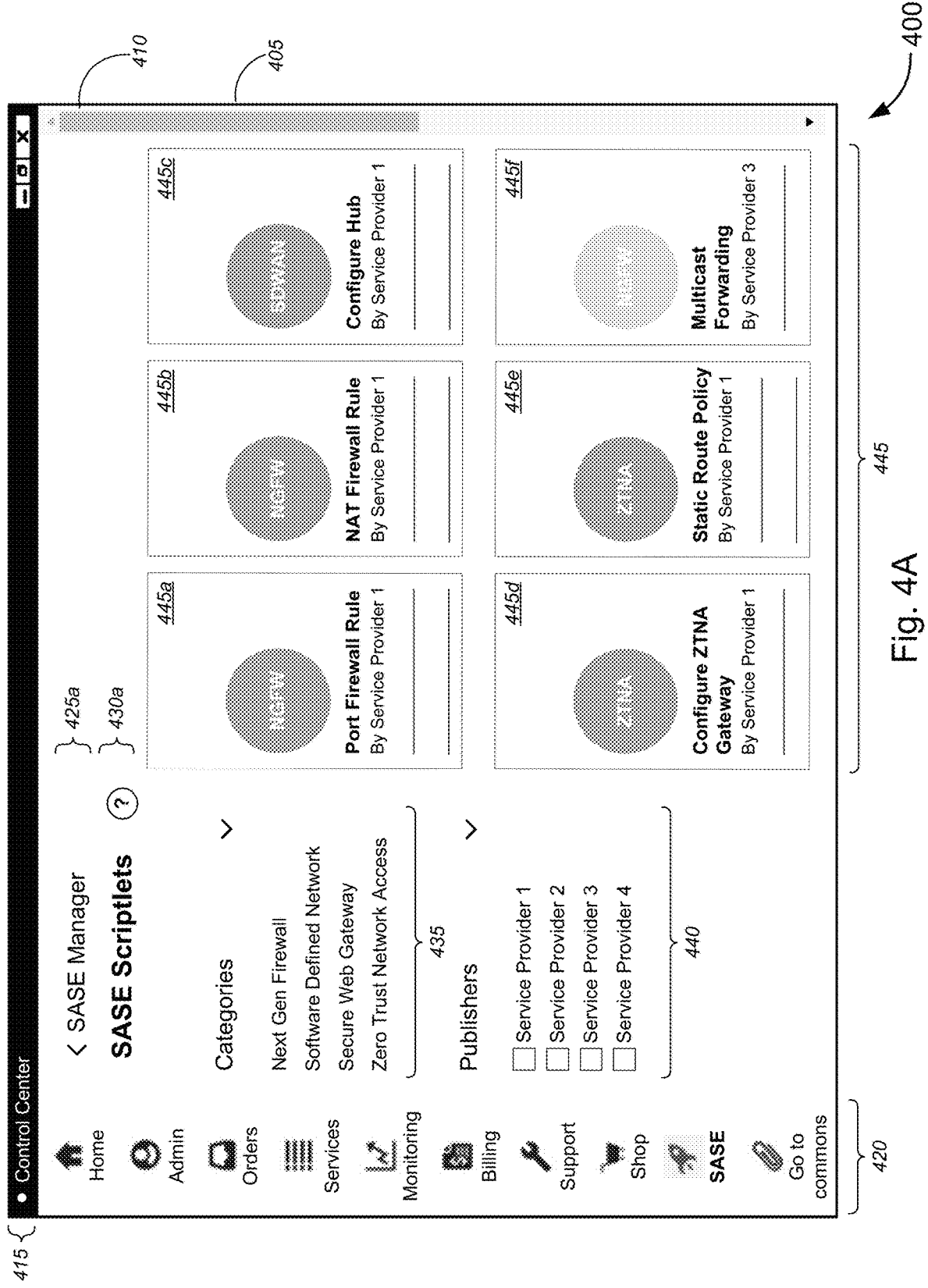
FIGS. 4A-4C are diagrams illustrating various non-limiting examples of user interfaces for a control center that may be used when implementing SASE scriptlets for providing SASE-based network services, in accordance with various embodiments.
Figure 4B:
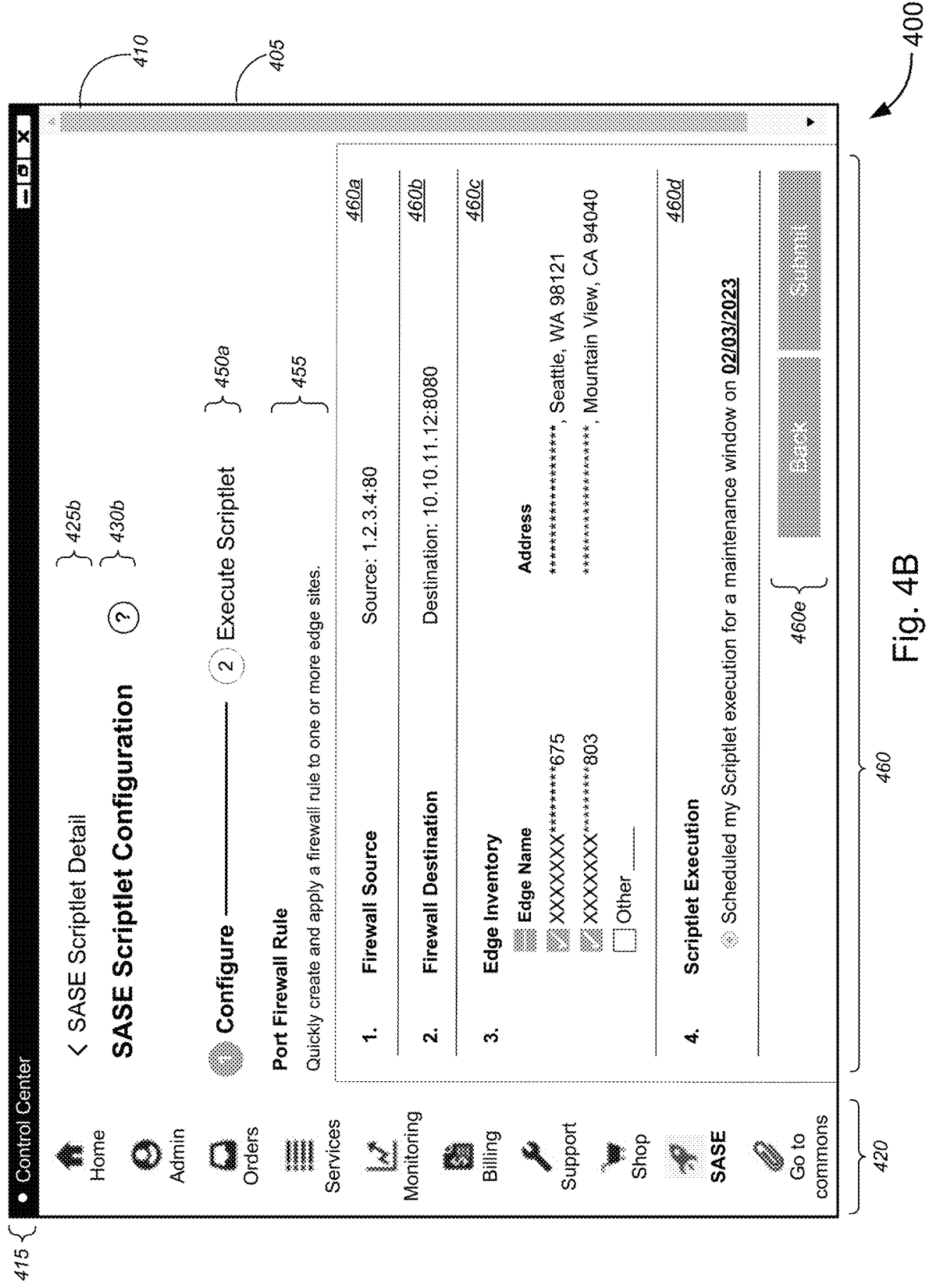
Figure 4C:
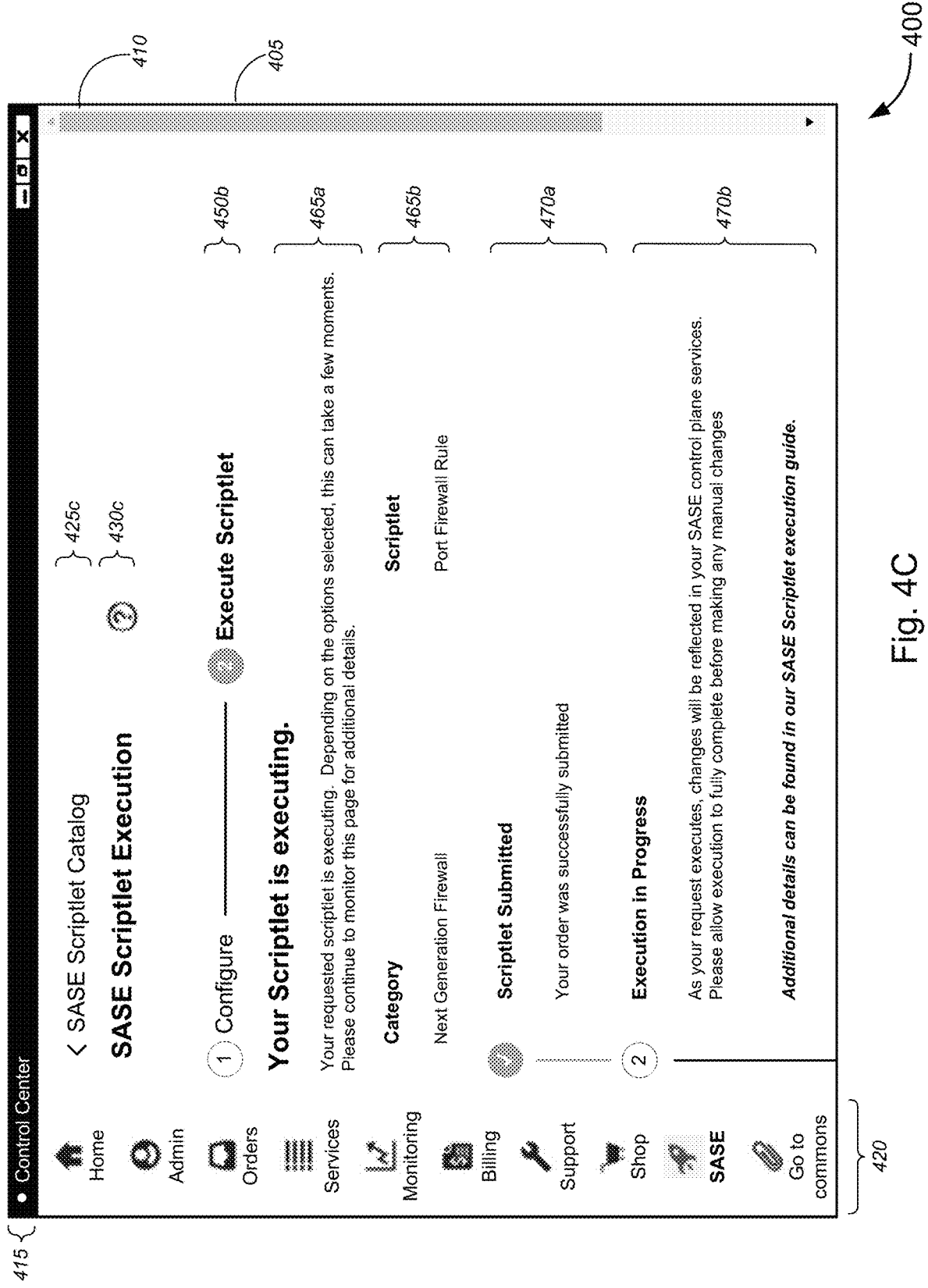

FIGS. 4A-4C (collectively, "FIG. 4") are diagrams illustrating various non-limiting examples of user interfaces for a control center that may be used when implementing SASE scriptlets for providing SASE-based network services, in accordance with various embodiments.

The embodiment as represented in FIG. 4 is merely illustrative and is not intended to limit the scope of the various embodiments. In addition, any suitable user device-including, but not limited to, user device(s) 145, which may each include, but is not limited to, one of a desktop computer, a laptop computer, a tablet computer, a smart phone, or a mobile phone, or any suitable device capable of communicating with computing system 105, customer portal 115a or 115b, edge node 160, and/or SASE system 180, or the like, via a web-based portal, an API, a server, an app, or any other suitable communications interface, or the like, over network(s) 165 and/or 170 of FIGS. 1 and 3, and the like—may be used to display or present the user interfaces of FIG. 4.

As shown in the embodiment of FIG. 4, display or display screen 405 (which may be a touchscreen display or a non-touchscreen display) may display or present an app, an application window, program window or portal (e.g., web portal or the like) (collectively, "app or portal 410" or the like). In the non-limiting example of FIG. 4, the app or portal 410 running on the user device may be a user interface illustrating a control center or network service manager, or the like (in some cases, including "Control Center" or the like), although the various embodiments are not limited to such an app or portal, as described herein, and can be any suitable app or portal. The app or portal 410 displayed in display 405 may provide a user (e.g., a technician, a service provider agent, or other representative, etc. of the service provider, and/or a customer, a user (e.g., the user(s) as described above with respect to FIGS. 1 and 3, or the like), or an agent of an entity, etc.) with the ability, functionality, or options to manage, configure, and/or execute one or more SASE scriptlets (as shown, e.g., in FIGS. 4A-4C, or the like) or to perform any other suitable functionality of the SASE scriptlets and/or SASE-based network services (such as described in detail with respect to FIGS. 1, 3, and 5, or the like).

As shown in the non-limiting example of FIGS. 4A-4C, the app or portal 410 may include, without limitation, at least one of a header portion 415 (e.g., indicating the app or portal site as "Control Center" or the like) and/or a navigation portion 420 (including icons or links for navigating to aspects or sections of the Control Center), and/or the like. In some cases, such as shown, e.g., in FIG. 4, the icons or links of the navigation portion 420 may include, but are not limited to, at least one of a home icon or link (which, when depressed, clicked, or activated, may link or navigate to a home page or landing page that is tailored for the user and/or the entity, or the like), an admin icon or link (which, when depressed, clicked, or activated, may link or navigate to an administration page for displaying administration options for the account(s) of the user or the entity, or the like), an orders icon or link (which, when depressed, clicked, or activated, may link or navigate to an orders page for managing orders of services and/or products, or the like), a services icon or link (which, when depressed, clicked, or activated, may link or navigate to a service management page for displaying management options for ordered services and/or products, or the like), a monitoring icon or link (which, when depressed, clicked, or activated, may link or navigate to a monitoring page for managing collection of, monitoring, and/or displaying metrics for ordered services and/or products, or the like), a billing icon or link (which, when depressed, clicked, or activated, may link or navigate to a billing page for displaying billing information for ordered services and/or products, or the like), a support icon or link (which, when depressed, clicked, or activated, may link or navigate to a support page for providing resources and contact information for seeking assistance with ordered services or products or with ordering new services or products, or the like), a shop icon or link (which, when depressed, clicked, or activated, may link or navigate to a shopping page for ordering new services and/or products, or the like), a SASE icon or link (which, when depressed, clicked, or activated, may link or navigate to a SASE manager page for managing SASE scriptlets and/or for managing SASE-based network services, or the like), or a "Go to commons" icon or link (which, when depressed, clicked, or activated, may link or navigate to a jump page for navigating to other pages or services, or the like), and/or the like.

Turning to the non-limiting example of FIG. 4A, the app or portal 410 may further include, without limitation, at least one of a section header portion 425a (e.g., indicating that a subpage of the SASE manager is being displayed, with a link that, when depressed, clicked, or activated, may return the user to the SASE manager page, or the like), a title portion 430a (e.g., indicating "SASE Scriptlets" page, or the like), a categories portion 435 (e.g., including a list of categories of services or products, including, but not limited to, next generation firewall ("NGFW" or other firewall), software defined network (e.g., SDWAN or other software defined network, etc.), secure web gateway, zero trust network access ("ZTNA"), and/or the like), a publishers portion 440 (e.g., including a list of publishers or service providers, in some cases, by name or brand associated with each publisher or service provider, or the like), and an application (or "app") tile portion 445 (e.g., including one of a horizontal listing (not shown), a vertical listing (not shown), or a grid-array or grid listing (as shown in FIG. 4A) of SASE scriptlets as app tiles, or the like). In some examples, the app tile portion 445 may include app tiles of SASE scriptlets including, but not limited to, at least one of a scriptlet 445a for a port firewall rule, a scriptlet 445b for a network address translation ("NAT") firewall rule, a scriptlet 445c for configuring one or more network sites as a hub of a SDWAN, a scriptlet 445d for configuring one or more network sites as a ZTNA gateway(s), a scriptlet 445e for creating and applying a static route policy for one or more ZTNA gateways, and a scriptlet 445f for configuring one or more network sites to enable multicast forwarding functionality, or the like. As shown, e.g., in FIG. 4A, the scriptlets 445a-445c may be published or provided by Service Provider 1, while scriptlet 445f may be published or provided by Service Provider 3. In some cases, Service Provider 1 may be the network service provider that also provides the user or the entity with network services (e.g., Internet services, or the like) other than SASE scriptlets or SASE-based network services. Although not shown, app tiles for other scriptlets may also be included, such other scriptlets including, without limitation, a scriptlet for deploying a firewall ("FW") at one or more network sites, a scriptlet for configuring a FW at one or more network sites, a scriptlet for deploying and configuring a FW at one or more network sites, a scriptlet for configuring one or more network sites as a SDWAN, a scriptlet for configuring one or more network sites as a spoke of a SDWAN, a scriptlet for configuring one or more network sites for SDWAN hub and spoke topology, a scriptlet for configuring one or more network sites with rapid threat defense ("RTD") security functionality, a scriptlet for connecting a point-of-service ("POS") device to one or more network sites, a scriptlet for connecting one or more user devices to one or more network sites, or a scriptlet for configuring one or more user devices with direct Internet access ("DIA") functionality, and/or the like.

Referring to the non-limiting example of FIG. 4B, the app or portal 410 may further include, without limitation, at least one of a section header portion 425b (e.g., indicating that a subpage of the SASE scriptlet detail is being displayed, with a link that, when depressed, clicked, or activated, may return the user to the SASE scriptlet detail page, or the like), a title portion 430b (e.g., indicating "SASE Scriptlet Configuration" page, or the like), a status portion 450a (e.g., indicating that the user is at the "Configure" stage of the process for configuring and executing the scriptlet, or the like), a summary portion 455 (e.g., indicating the scriptlet that was selected by the user (in this case, "Port Firewall Rule" scriptlet 445a as shown in FIG. 4A, or the like), and in some cases a brief description of the scriptlet (in this case, to quickly create and apply a firewall rule to one or more edge sites, or the like), and the like), or a scriptlet configuration field section 460 (e.g., including fields for entering information for configuring the selected scriptlet, or the like), and/or the like. In some examples, the scriptlet configuration field section 460 (at least in the case of the firewall scriptlet; which section may be changed to adapt to other types of scriptlets that have other relevant fields or information, etc.) may include, but is not limited to, a firewall source sub-portion 460a (e.g., including options or fields for entering or displaying a source Internet Protocol ("IP") address, or the like), a firewall destination sub-portion 460b (e.g., including options or fields for entering or displaying a destination IP address, or the like), an edge inventory sub-portion 460c (e.g., including options or fields for entering, selecting (or deselecting), and/or displaying names and addresses of network (edge) devices on which to install, deploy, or execute the selected scriptlet, or the like), a scriptlet execution sub-portion 460d (e.g., including options or fields for selecting (or deselecting), entering, and/or displaying how the user would like the scriptlet to be executed (e.g., executed immediately after deployment and configuration of the selected scriptlet have been completed (not shown); scheduling execution of the selected scriptlet during a maintenance period (as shown, e.g., in FIG. 4B, or the like); or manually reviewing, configuring, and executing the selected scriptlet (not shown); etc.), and/or a button sub-portion 460e (e.g., including (virtual) buttons for going back to a previous sub-page of the configuration process, or for submitting the selected scriptlet together with the selected or entered configuration information, or the like), and/or the like.

With reference to the non-limiting example of FIG. 4C, the app or portal 410 may further include, without limitation, at least one of a section header portion 425c (e.g., indicating that a subpage of the SASE scriptlet catalog is being displayed, with a link that, when depressed, clicked, or activated, may return the user to the SASE scriptlet catalog page, or the like), a title portion 430c (e.g., indicating "SASE Scriptlet Execution" page, or the like), a status portion 450b (e.g., indicating that the user is at the "Execute Scriptlet" stage of the process for configuring and executing the scriptlet, or the like), a process status portion 465a (e.g., indicating that the scriptlet is executing and, in some cases, including a brief note regarding the scriptlet execution, or the like), a scriptlet overview portion 465b (e.g., indicating the category (in this case, "Next Generation Firewall") and the scriptlet (in this case, "Port Firewall Rule"), or the like), or a process overview portion 470 (e.g., indicating details regarding the portions of the process for configuring and executing the scriptlet, or the like), and/or the like. In some examples, the process overview portion 470 may include a sub-portion 470a (e.g., indicating that the scriptlet order has been successfully submitted, or not, etc.) and a sub-portion 470b (e.g., indicating that the execution is in progress, in some cases with notes regarding execution of the scriptlet, or the like), and/or the like.

Herein, "X" and "*" in FIG. 4 represents redacted information, for the purposes of simplicity of illustration in this patent document, but would be visible to a user during regular use of the Control Center UI for managing SASE scriptlets (unless otherwise indicated).

Figure 5A:
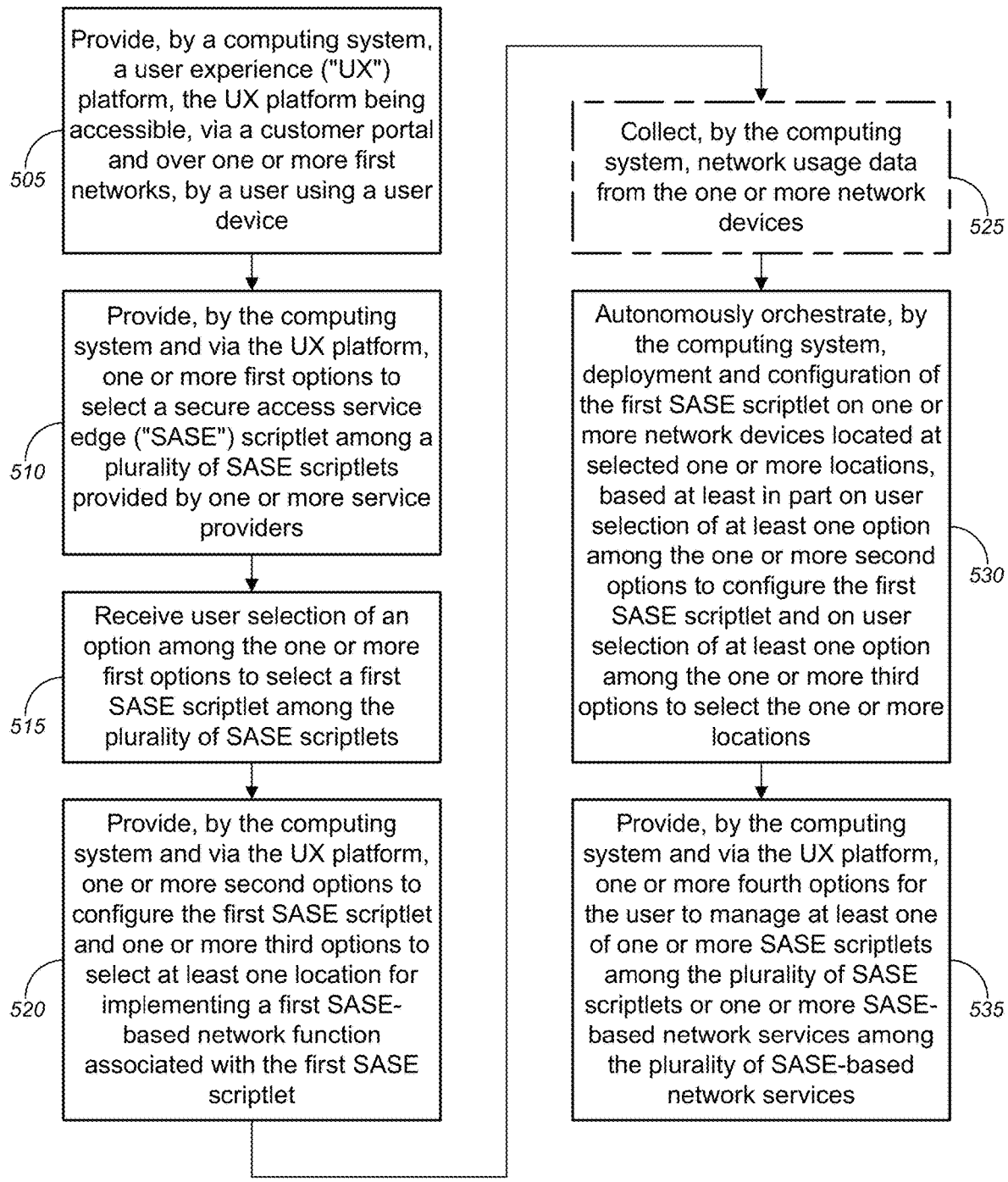
FIGS. 5A and 5B are flow diagrams illustrating a method for implementing a customer portal for providing a UX for customers to order and configure SASE scriptlets for providing SASE-based network services that are subsequently autonomously provisioned via a network(s) and autonomously configured, in accordance with various embodiments.
Figure 5B:
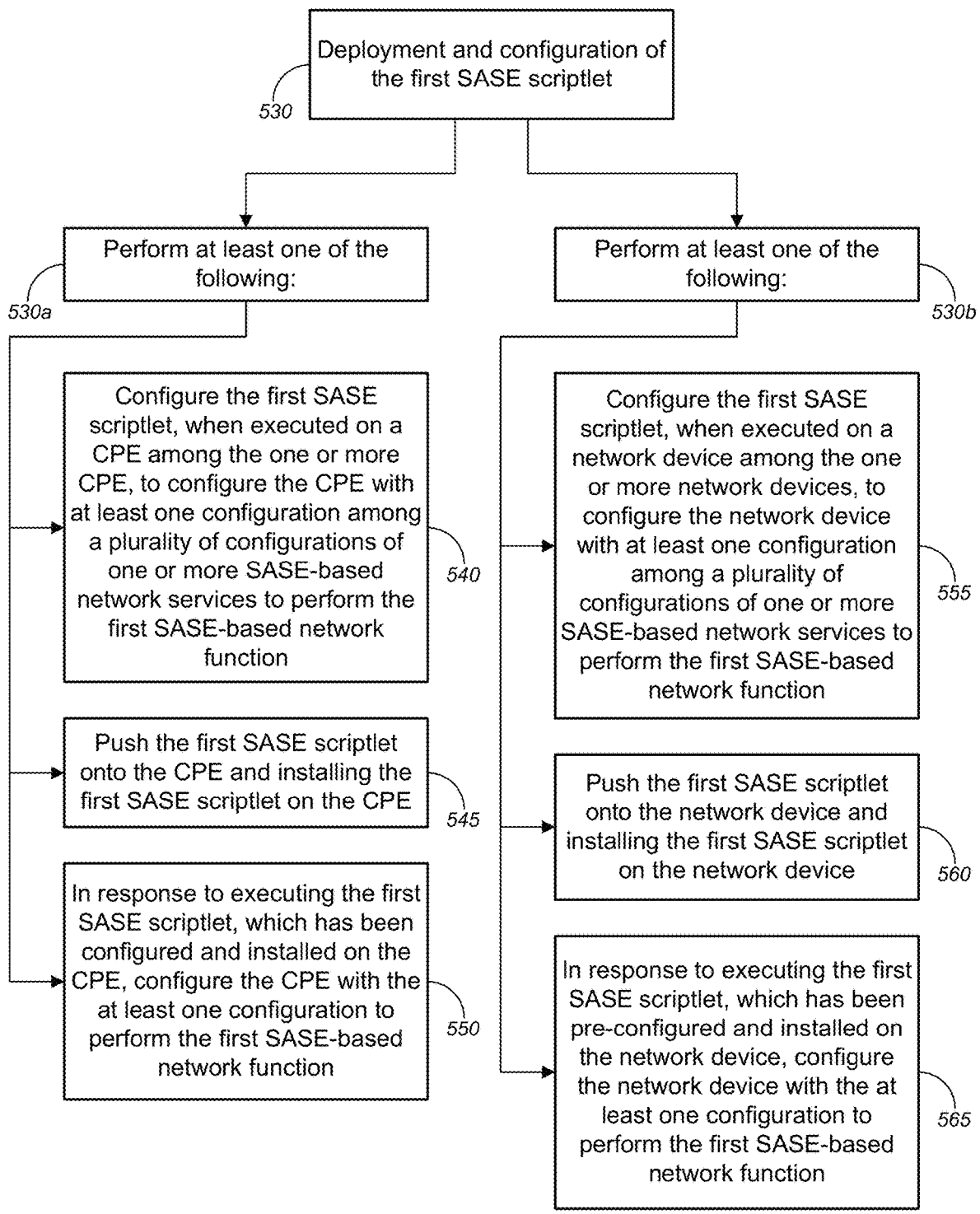

FIGS. 5A and 5B (collectively, "FIG. 5") are flow diagrams illustrating a method 500 for implementing a customer portal for providing a UX for customers to order and configure SASE scriptlets for providing SASE-based network services that are subsequently autonomously provisioned via a network(s) and autonomously configured, in accordance with various embodiments.

While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems, examples, or embodiments 100, 200, 300, and 400 of FIGS. 1, 2, 3, and 4, respectively (or components thereof), such methods may also be implemented using any suitable hardware (or software) implementation. Similarly, while each of the systems, examples, or embodiments 100, 200, 300, and 400 of FIGS. 1, 2, 3, and 4, respectively (or components thereof), can operate according to the method 500 illustrated by FIG. 5 (e.g., by executing instructions embodied on a computer readable medium), the systems, examples, or embodiments 100, 200, 300, and 400 of FIGS. 1, 2, 3, and 4 can each also operate according to other modes of operation and/or perform other suitable procedures.

In the non-limiting embodiment of FIG. 5A, method 500, at operation 505, may comprise providing, by a computing system, a user experience ("UX") platform, the UX platform being accessible, via a customer portal and over one or more first networks, by a user using a user device. At operation 510, method 500 may comprise providing, by the computing system and via the UX platform, one or more first options to select a secure access service edge ("SASE") scriptlet among a plurality of SASE scriptlets provided by one or more service providers, each SASE scriptlet being a software code that when executed is used to perform at least one specific SASE-based network function among a plurality of SASE-based network functions. Method 500 may further comprise, at operation 515, receiving user selection of an option among the one or more first options to select a first SASE scriptlet among the plurality of SASE scriptlets. Method 500 may further comprise, in response to receiving user selection of an option among the one or more first options to select a first SASE scriptlet among the plurality of SASE scriptlets, providing, by the computing system and via the UX platform, one or more second options to configure the first SASE scriptlet and one or more third options to select at least one location for implementing a first SASE-based network function associated with the first SASE scriptlet (operation 520).

At optional operation 525, method 500 may comprise collecting, by the computing system, network usage data from the one or more network devices. Method 500, at operation 530, may comprise autonomously orchestrating, by the computing system, deployment and configuration of the first SASE scriptlet on one or more network devices located at selected one or more locations, based at least in part on user selection of at least one option among the one or more second options to configure the first SASE scriptlet and on user selection of at least one option among the one or more third options to select the one or more locations, and in some cases, also based at least in part on analysis of the collected network usage data to optimize the first SASE-based network function associated with the first SASE scriptlet.

In some embodiments, the computing system may include, without limitation, at least one of a web-based digital marketplace computing system, a portal-based digital marketplace computing system, a software application ("app")-based digital marketplace computing system, a server computer, a customer interface server, a network service reservation and ordering platform server, a gateway controller, a network provisioning server, a cloud computing system, or a distributed computing system, and/or the like.

According to some embodiments, the plurality of SASE-based network functions may be part of a plurality of SASE-based network services that collectively comprises a set of unified, cloud-based services that integrate software-defined wide area network ("SD-WAN") functionalities with network service functionalities and network security functionalities. In some instances, the plurality of SASE-based network services may be part of a plurality of network services further including, but not limited to, at least one of a plurality of network service software applications ("apps"), one or more Internet services, one or more WAN services, one or more SD-WAN services, one or more network security services, one or more telephony services, one or more voice over Internet Protocol ("VoIP") services, or other network services, and/or the like. In some cases, the network service functionalities may include, without limitation, at least one of WAN optimization functionalities, software-defined application-centric network control functionalities, data loss prevention ("DLP") functionalities, application performance management ("APM") functionalities, bandwidth aggregation functionalities, network as a service ("NaaS") functionalities, global private network functionalities, software as a service ("SaaS") functionalities, content distribution network ("CDN") functionalities, or multi-cloud networking functionalities, and/or the like. In some instances, the network security functionalities may include, but are not limited to, at least one of firewall as a service ("FWaaS") functionalities, secure web gateway ("SWG") functionalities, zero-trust network access ("ZTNA") functionalities, anti-malware functionalities, intrusion detection functionalities, intrusion prevention functionalities, cloud access security broker ("CASB") functionalities, remote browser isolation ("RBI") functionalities, web application and application programming interface ("API") protection ("WAAP") functionalities, secure sockets layer ("SSL") or transport layer security ("TLS") inspection functionalities, or network-based threat detection functionalities, and/or the like.

In some instances, method 500 may further comprise, at operation 535, providing, by the computing system and via the UX platform, one or more fourth options for the user to manage at least one of one or more SASE scriptlets among the plurality of SASE scriptlets or one or more SASE-based network services among the plurality of SASE-based network services. In some examples, the one or more fourth options may include, without limitation, at least one of: one or more options to change at least one of deployment, configuration, settings, location, or operation of at least one of one or more SASE scriptlets among the plurality of SASE scriptlets or one or more SASE-based network functions associated with the corresponding one or more SASE scriptlets; one or more options to provide, update, or customize at least one of configuration information or policies for one or more of deployment, configuration, or operation of at least one of one or more SASE scriptlets among the plurality of SASE scriptlets or one or more SASE-based network functions associated with the corresponding one or more SASE scriptlets; one or more options to view at least one of one or more metrics, one or more operations, one or more overviews, one or more summaries, one or more reports, one or more performance alerts, one or more trouble tickets, one or more insights, or one or more dashboard features associated with at least one of one or more SASE scriptlets among the plurality of SASE scriptlets or one or more SASE-based network functions associated with the corresponding one or more SASE scriptlets; one or more options to view at least one of a dashboard or a network map that presents an overlay of at least one of one or more SASE scriptlets among the plurality of SASE scriptlets or one or more SASE-based network functions associated with the corresponding one or more SASE scriptlets being deployed on a plurality of network devices associated with the user or an entity with which the user is associated, regardless of platform or third party service providers that provide the one or more SASE scriptlets; one or more options to provide the user with curated access to one or more platforms or one or more portals of third party service providers that provide one or more second SASE scriptlets that have been deployed at least one network device associated with the user or the entity; or one or more options to purchase and configure additional SASE scriptlets among the plurality of SASE scriptlets; and/or the like. In some examples, the one or more options to purchase and configure additional SASE-based network services may be selected, tailored, and presented to the user based on tracking of transaction history or interest of the user, the entity, or an industry in which the user or the entity belongs.

In some embodiments, providing the one or more first options to select a SASE scriptlet among the plurality of SASE scriptlets may comprise presenting, by the computing system and via the UX platform, one or more application ("app") tiles within a display field of the UX platform, each app tile corresponding to one of the plurality of SASE scriptlets, the app tiles being arranged in one of a horizontal list of SASE scriptlets, a vertical list of SASE scriptlets, or a grid-array of SASE scriptlets, and/or the like.

Merely by way of example, in some cases, the plurality of SASE scriptlets may include, but is not limited to, at least one of a SASE scriptlet for deploying a firewall ("FW") at one or more network sites, a SASE scriptlet for configuring a FW at one or more network sites, a SASE scriptlet for deploying and configuring a FW at one or more network sites, a SASE scriptlet for creating and applying a port firewall rule to one or more network sites, a SASE scriptlet for creating and applying a network address translation ("NAT") firewall rule to one or more network sites, a SASE scriptlet for configuring one or more network sites as a SDWAN, a SASE scriptlet for configuring one or more network sites as a hub of a SDWAN, a SASE scriptlet for configuring one or more network sites as a spoke of a SDWAN, a SASE scriptlet for configuring one or more network sites for SDWAN hub and spoke topology, a SASE scriptlet for configuring one or more network sites as ZTNA gateways, a SASE scriptlet for creating and applying a static route policy for one or more ZTNA gateways, a SASE scriptlet for configuring one or more network sites to enable multicast forwarding functionality, a SASE scriptlet for configuring one or more network sites with rapid threat defense ("RTD") security functionality, a SASE scriptlet for connecting a point-of-service ("POS") device to one or more network sites, a SASE scriptlet for connecting one or more user devices to one or more network sites, or a SASE scriptlet for configuring one or more user devices with direct Internet access ("DIA") functionality; and/or the like.

With reference to the non-limiting example of FIG. 5B, in some instances, the one or more network devices may each be associated with at least one of the user, an entity with which the user is associated, or a service provider among the one or more service providers that is providing network services to the user or the entity. In such cases, the one or more network devices may include, without limitation, at least one of one or more servers, one or more network nodes, one or more network edge devices, or one or more customer premises equipment ("CPE"), and/or the like.

In some cases, the selected one or more locations may include, but are not limited to, a customer premises. Each of the one or more CPE may be located at a customer premises, the customer premises including, without limitation, one of a residential customer premises, a business customer premises, a corporate customer premises, an enterprise customer premises, an education facility customer premises, a medical facility customer premises, or a governmental customer premises, and/or the like. In some examples, the user selection of the at least one option among the one or more second options to configure the first SASE scriptlet may include, but is not limited to, user selection of options to configure the first SASE scriptlet with at least one configuration among a plurality of configurations of one or more SASE-based network services to enable the first SASE scriptlet to perform the first SASE-based network function and/or to configure the first SASE scriptlet, when executed on each of the one or more CPE, to configure each of the one or more CPE with the at least one configuration to perform the first SASE-based network function. In some instances, deployment and configuration of the first SASE scriptlet (at operation 530) may comprise, at operation 530a, performing at least one of: configuring the first SASE scriptlet, when executed on a CPE among the one or more CPE, to configure the CPE with at least one configuration among a plurality of configurations of one or more SASE-based network services to perform the first SASE-based network function (operation 540); pushing the first SASE scriptlet onto the CPE and installing the first SASE scriptlet on the CPE (operation 545); or in response to executing the first SASE scriptlet, which has been configured and installed on the CPE, configuring the CPE with the at least one configuration to perform the first SASE-based network function (operation 550); and/or the like.

Alternatively, the selected one or more locations may include, but are not limited to, one or more second networks. At least one of the one or more servers, the one or more network nodes, or the one or more network edge devices may be located within the one or more second networks. In some instances, at least one of the one or more second networks may be the same network as at least one of the one or more first networks. In some examples, the user selection of the at least one option among the one or more second options to configure the first SASE scriptlet may include, without limitation, user selection of options to configure the first SASE scriptlet with at least one configuration among a plurality of configurations of one or more SASE-based network services to enable the first SASE scriptlet to perform the first SASE-based network function and/or to configure the first SASE scriptlet, when executed on each of the one or more network devices, to configure each of the one or more network devices with the at least one configuration to perform the first SASE-based network function. In some cases, deployment and configuration of the first SASE scriptlet (at operation 530) may comprise, at operation 530b, performing at least one of: configuring the first SASE scriptlet, when executed on a network device among the one or more network devices, to configure the network device with at least one configuration among a plurality of configurations of one or more SASE-based network services to perform the first SASE-based network function (operation 555); pushing the first SASE scriptlet onto the network device and installing the first SASE scriptlet on the network device (operation 560); or in response to executing the first SASE scriptlet, which has been pre-configured and installed on the network device, configuring the network device with the at least one configuration to perform the first SASE-based network function (operation 565); and/or the like.

In some embodiments, the user selection of the at least one option among the one or more second options to configure the first SASE scriptlet may further comprise user selection of one or more fifth options for executing the first SASE scriptlet, the one or more fifth options comprising one of: one or more options for automatically executing the first SASE scriptlet immediately after deployment and configuration of the first SASE scriptlet have been completed; one or more options for scheduling automatic execution of the first SASE scriptlet, which has been deployed and configured, during a maintenance period; or one or more options for manually reviewing, configuring, and executing the first SASE scriptlet; and/or the like.

Exemplary System and Hardware Implementation

Figure 6:
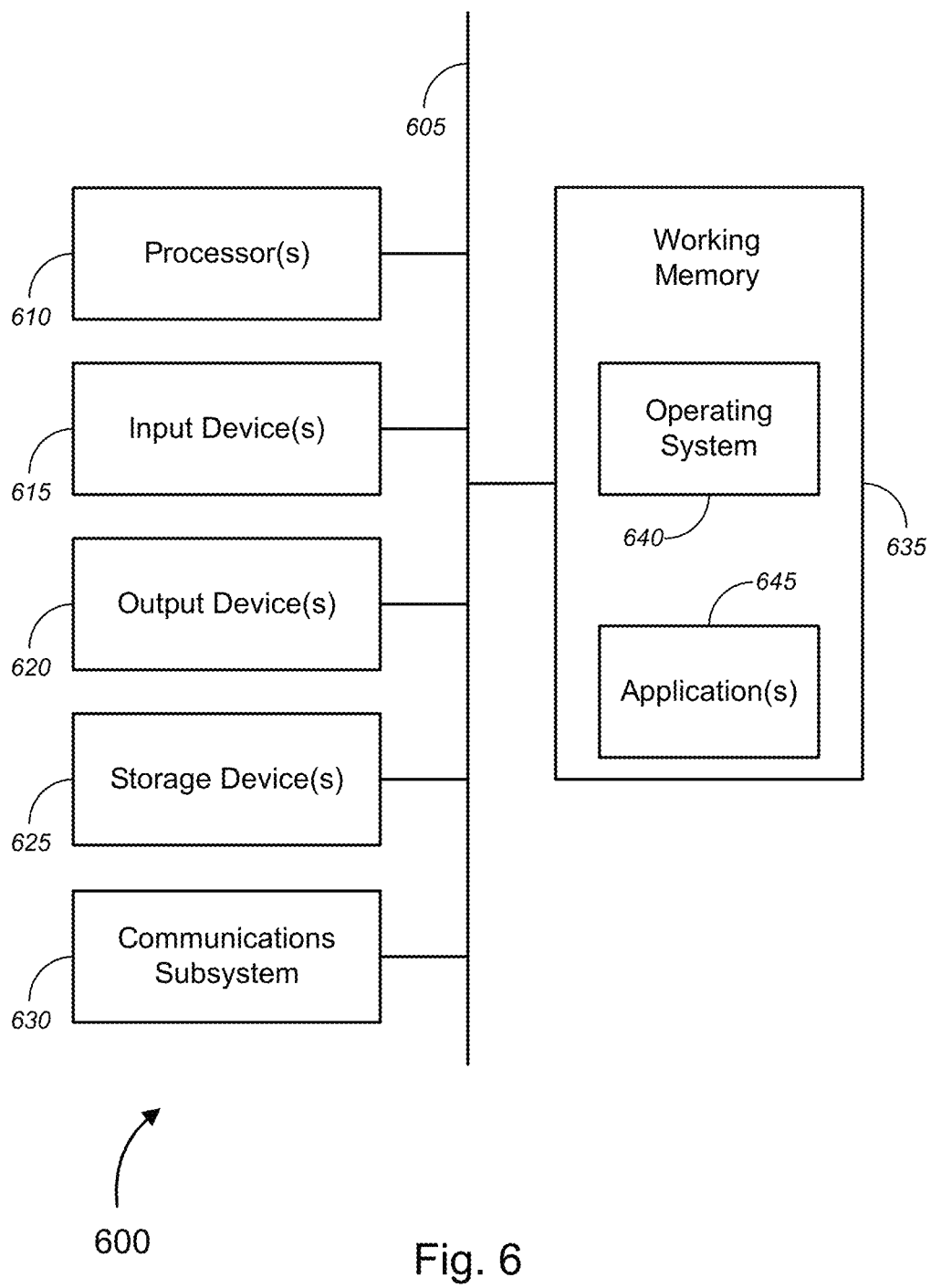
FIG. 6 is a block diagram illustrating an exemplary computer or system hardware architecture, in accordance with various embodiments.

FIG. 6 is a block diagram illustrating an exemplary computer or system hardware architecture, in accordance with various embodiments. FIG. 6 provides a schematic illustration of one embodiment of a computer system 600 of the service provider system hardware that can perform the methods provided by various other embodiments, as described herein, and/or can perform the functions of computer or hardware system (i.e., computing system or system platform 105 or 205, customer portal 115a, 115b, 115, or 215, network service provisioning system 120, IT platform services system 125 or 225, network service monitoring system 130a, 130b, 130, or 230, user devices 145a-145n, network devices 150a-150n, gateway device or CPE 155a-155n, 155, or 255, edge nodes 160 and 260, and secure access service edge ("SASE") system 180, etc.), as described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer or hardware system 600—which might represent an embodiment of the computer or hardware system (i.e., computing system or system platform 105 or 205, customer portal 115a, 115b, 115, or 215, network service provisioning system 120, IT platform services system 125 or 225, network service monitoring system 130a, 130b, 130, or 230, user devices 145a-145n and 150a-150n, gateway device or CPE 155a-155n, 155, or 255, and edge nodes 160 and 260, etc.), described above with respect to FIGS. 1-5—is shown comprising hardware elements that can be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and/or the like); one or more input devices 615, which can include, without limitation, a mouse, a keyboard, and/or the like; and one or more output devices 620, which can include, without limitation, a display device, a printer, and/or the like.

The computer or hardware system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 600 might also include a communications subsystem 630, which can include, without limitation, a modem, a network card (wireless or wired), an infra-red communication device, a wireless communication device and/or chipset (such as a Bluetooth™ device, an 802.11 device, a Wi-Fi device, a WiMAX device, a wireless wide area network ("WWAN") device, cellular communication facilities, etc.), and/or the like. The communications subsystem 630 may permit data to be exchanged with a network (such as the network described below, to name one example), with other computer or hardware systems, and/or with any other devices described herein. In many embodiments, the computer or hardware system 600 will further comprise a working memory 635, which can include a RAM or ROM device, as described above.

The computer or hardware system 600 also may comprise software elements, shown as being currently located within the working memory 635, including an operating system 640, device drivers, executable libraries, and/or other code, such as one or more application programs 645, which may comprise computer programs provided by various embodiments (including, without limitation, hypervisors, virtual machines ("VMs"), and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 600 and/or might take the form of source and/or installable code, which, upon compilation and/or installation on the computer or hardware system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 600) to perform methods in accordance with various embodiments of the invention. According to a set of embodiments, some or all of the procedures of such methods are performed by the computer or hardware system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire, and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    providing, by a computing system, a user experience ("UX") platform, the UX platform being accessible, via a customer portal and over one or more first networks, by a user using a user device;
    providing, by the computing system and via the UX platform, one or more first options to select a secure access service edge ("SASE") scriptlet among a plurality of SASE scriptlets provided by one or more service providers, each SASE scriptlet being a software code that when executed is used to perform at least one specific SASE-based network function among a plurality of SASE-based network functions;
    in response to receiving user selection of an option among the one or more first options to select a first SASE scriptlet among the plurality of SASE scriptlets, providing, by the computing system and via the UX platform, one or more second options to configure the first SASE scriptlet and one or more third options to select at least one location for implementing a first SASE-based network function associated with the first SASE scriptlet; and
    autonomously orchestrating, by the computing system, deployment and configuration of the first SASE scriptlet on one or more network devices located at selected one or more locations, based at least in part on user selection of at least one option among the one or more second options to configure the first SASE scriptlet and on user selection of at least one option among the one or more third options to select the one or more locations.

2. The method of claim 1, wherein the computing system comprises at least one of a web-based digital marketplace computing system, a portal-based digital marketplace computing system, a software application ("app")-based digital marketplace computing system, a server computer, a customer interface server, a network service reservation and ordering platform server, a gateway controller, a network provisioning server, a cloud computing system, or a distributed computing system.

3. The method of claim 1, wherein the plurality of SASE-based network functions is part of a plurality of SASE-based network services that collectively comprises a set of unified, cloud-based services that integrate software-defined wide area network ("SD-WAN") functionalities with network service functionalities and network security functionalities.

4. The method of claim 3, further comprising:
    providing, by the computing system and via the UX platform, one or more fourth options for the user to manage at least one of one or more SASE scriptlets among the plurality of SASE scriptlets or one or more SASE-based network services among the plurality of SASE-based network services, the one or more fourth options comprising at least one of:
        one or more options to change at least one of deployment, configuration, settings, location, or operation of at least one of one or more SASE scriptlets among the plurality of SASE scriptlets or one or more SASE-based network functions associated with the corresponding one or more SASE scriptlets;
        one or more options to provide, update, or customize at least one of configuration information or policies for one or more of deployment, configuration, or operation of at least one of one or more SASE scriptlets among the plurality of SASE scriptlets or one or more SASE-based network functions associated with the corresponding one or more SASE scriptlets;
        one or more options to view at least one of one or more metrics, one or more operations, one or more overviews, one or more summaries, one or more reports, one or more performance alerts, one or more trouble tickets, one or more insights, or one or more dashboard features associated with at least one of one or more SASE scriptlets among the plurality of SASE scriptlets or one or more SASE-based network functions associated with the corresponding one or more SASE scriptlets;
        one or more options to view at least one of a dashboard or a network map that presents an overlay of at least one of one or more SASE scriptlets among the plurality of SASE scriptlets or one or more SASE-based network functions associated with the corresponding one or more SASE scriptlets being deployed on a plurality of network devices associated with the user or an entity with which the user is associated, regardless of platform or third party service providers that provide the one or more SASE scriptlets;
        one or more options to provide the user with curated access to one or more platforms or one or more portals of third party service providers that provide one or more second SASE scriptlets that have been deployed at least one network device associated with the user or the entity; or
        one or more options to purchase and configure additional SASE scriptlets among the plurality of SASE scriptlets.

5. The method of claim 4, wherein the one or more options to purchase and configure additional SASE-based network services is selected, tailored, and presented to the user based on tracking of transaction history or interest of the user, the entity, or an industry in which the user or the entity belongs.

6. The method of claim 1, wherein providing the one or more first options to select a SASE scriptlet among the plurality of SASE scriptlets comprises presenting, by the computing system and via the UX platform, one or more application ("app") tiles within a display field of the UX platform, each app tile corresponding to one of the plurality of SASE scriptlets, the app tiles being arranged in one of a horizontal list of SASE scriptlets, a vertical list of SASE scriptlets, or a grid-array of SASE scriptlets.

7. The method of claim 1, wherein the plurality of SASE scriptlets comprises at least one of a SASE scriptlet for deploying a firewall ("FW") at one or more network sites, a SASE scriptlet for configuring a FW at one or more network sites, a SASE scriptlet for deploying and configuring a FW at one or more network sites, a SASE scriptlet for creating and applying a port firewall rule to one or more network sites, a SASE scriptlet for creating and applying a network address translation ("NAT") firewall rule to one or more network sites, a SASE scriptlet for configuring one or more network sites as a software defined wide area network ("SDWAN"), a SASE scriptlet for configuring one or more network sites as a hub of a SDWAN, a SASE scriptlet for configuring one or more network sites as a spoke of a SDWAN, a SASE scriptlet for configuring one or more network sites for SDWAN hub and spoke topology, a SASE scriptlet for configuring one or more network sites as zero trust network access ("ZTNA") gateways, a SASE scriptlet for creating and applying a static route policy for one or more ZTNA gateways, a SASE scriptlet for configuring one or more network sites to enable multicast forwarding functionality, a SASE scriptlet for configuring one or more network sites with rapid threat defense ("RTD") security functionality, a SASE scriptlet for connecting a point-of-service ("POS") device to one or more network sites, a SASE scriptlet for connecting one or more user devices to one or more network sites, or a SASE scriptlet for configuring one or more user devices with direct Internet access ("DIA") functionality.

8. The method of claim 1, wherein the one or more network devices are each associated with at least one of the user, an entity with which the user is associated, or a service provider among the one or more service providers that is providing network services to the user or the entity, wherein the one or more network devices comprise at least one of one or more servers, one or more network nodes, one or more network edge devices, or one or more customer premises equipment ("CPE").

9. The method of claim 8, wherein the selected one or more locations comprise a customer premises, wherein each of the one or more CPE is located at the customer premises, the customer premises comprising one of a residential customer premises, a business customer premises, a corporate customer premises, an enterprise customer premises, an education facility customer premises, a medical facility customer premises, or a governmental customer premises.

10. The method of claim 9, wherein the user selection of the at least one option among the one or more second options to configure the first SASE scriptlet comprises user selection of options to configure the first SASE scriptlet with at least one configuration among a plurality of configurations of one or more SASE-based network services to enable the first SASE scriptlet to perform the first SASE-based network function and/or to configure the first SASE scriptlet, when executed on each of the one or more CPE, to configure each of the one or more CPE with the at least one configuration to perform the first SASE-based network function.

11. The method of claim 9, wherein deployment and configuration of the first SASE scriptlet comprise performing at least one of:
configuring the first SASE scriptlet, when executed on a CPE among the one or more CPE, to configure the CPE with at least one configuration among a plurality of configurations of one or more SASE-based network services to perform the first SASE-based network function;
pushing the first SASE scriptlet onto the CPE and installing the first SASE scriptlet on the CPE; or
in response to executing the first SASE scriptlet, which has been configured and installed on the CPE, configuring the CPE with the at least one configuration to perform the first SASE-based network function.

12. The method of claim 8, wherein the selected one or more locations comprise one or more second networks, wherein at least one of the one or more servers, the one or more network nodes, or the one or more network edge devices are located within the one or more second networks, wherein at least one of the one or more second networks is the same network as at least one of the one or more first networks.

13. The method of claim 12, wherein the user selection of the at least one option among the one or more second options to configure the first SASE scriptlet comprises user selection of options to configure the first SASE scriptlet with at least one configuration among a plurality of configurations of one or more SASE-based network services to enable the first SASE scriptlet to perform the first SASE-based network function and/or to configure the first SASE scriptlet, when executed on each of the one or more network devices, to configure each of the one or more network devices with the at least one configuration to perform the first SASE-based network function.

14. The method of claim 12, wherein deployment and configuration of the first SASE scriptlet comprise performing at least one of:
configuring the first SASE scriptlet, when executed on a network device among the one or more network devices, to configure the network device with at least one configuration among a plurality of configurations of one or more SASE-based network services to perform the first SASE-based network function;
pushing the first SASE scriptlet onto the network device and installing the first SASE scriptlet on the network device; or
in response to executing the first SASE scriptlet, which has been pre-configured and installed on the network device, configuring the network device with the at least one configuration to perform the first SASE-based network function.

15. The method of claim 1, wherein the user selection of the at least one option among the one or more second options to configure the first SASE scriptlet further comprises user selection of one or more fifth options for executing the first SASE scriptlet, the one or more fifth options comprising one of:
one or more options for automatically executing the first SASE scriptlet immediately after deployment and configuration of the first SASE scriptlet have been completed;
one or more options for scheduling automatic execution of the first SASE scriptlet, which has been deployed and configured, during a maintenance period; or
one or more options for manually reviewing, configuring, and executing the first SASE scriptlet.

16. The method of claim 1, further comprising:
collecting, by the computing system, network usage data from the one or more network devices;
wherein autonomously orchestrating configuration of the first SASE scriptlet is further performed based at least in part on analysis of the collected network usage data to optimize the first SASE-based network function associated with the first SASE 6 scriptlet.

17. A system, comprising:
a computing system, comprising:
- at least one first processor; and
- a first non-transitory computer readable medium communicatively coupled to the at least one first processor, the first non-transitory computer readable medium having stored thereon computer software comprising a first set of instructions that, when executed by the at least one first processor, causes the computing system to:
  - provide a user experience ("UX") platform, the UX platform being accessible, via a customer portal and over one or more first networks, by a user using a user device;
  - provide, via the UX platform, one or more first options to select a secure access service edge ("SASE") scriptlet among a plurality of SASE scriptlets provided by one or more service providers, each SASE scriptlet being a software code that when executed is used to perform at least one specific SASE-based network function among a plurality of SASE-based network functions;
  - in response to receiving user selection of an option among the one or more first options to select a first SASE scriptlet among the plurality of SASE scriptlets, provide, via the UX platform, one or more second options to configure the first SASE scriptlet and one or more third options to select at least one location for implementing a first SASE-based network function associated with the first SASE scriptlet; and
  - autonomously orchestrate deployment and configuration of the first SASE scriptlet on one or more network devices located at selected one or more locations, based at least in part on user selection of at least one option among the one or more second options to configure the first SASE scriptlet and on user selection of at least one option among the one or more third options to select the one or more locations.

18. A method, comprising:
autonomously orchestrating, by a secure access service edge ("SASE") manager, deployment and configuration of one or more SASE scriptlets on one or more network devices located at selected one or more locations, based at least in part on user selection of at least one option among one or more first options to select the one or more SASE scriptlets from among a plurality of SASE scriptlets, on user selection of at least one option among the one or more second options to configure the first SASE scriptlet and on user selection of at least one option among the one or more third options to select the one or more locations, each SASE scriptlet being a software code that when executed is used to perform at least one specific SASE-based network function among a plurality of SASE-based network functions, wherein the plurality of SASE-based network functions is part of a plurality of SASE-based network services that collectively comprises a set of unified, cloud-based services that integrate software-defined wide area network ("SD-WAN") functionalities with network service functionalities and network security functionalities.

19. The method of claim 18, wherein the plurality of SASE-based network services is part of a plurality of network services further comprising at least one of a plurality of network service software applications ("apps"), one or more Internet services, one or more WAN services, one or more SD-WAN services, one or more network security services, one or more telephony services, one or more voice over Internet Protocol ("VoIP") services, or other network services, wherein the network service functionalities comprise at least one of WAN optimization functionalities, software-defined application-centric network control functionalities, data loss prevention ("DLP") functionalities, application performance management ("APM") functionalities, bandwidth aggregation functionalities, network as a service ("NaaS") functionalities, global private network functionalities, software as a service ("SaaS") functionalities, content distribution network ("CDN") functionalities, or multi-cloud networking functionalities, wherein the network security functionalities comprise at least one of firewall as a service ("FWaaS") functionalities, secure web gateway ("SWG") functionalities, zero-trust network access ("ZTNA") functionalities, anti-malware functionalities, intrusion detection functionalities, intrusion prevention functionalities, cloud access security broker ("CASB") functionalities, remote browser isolation ("RBI") functionalities, web application and application programming interface ("API") protection ("WAAP") functionalities, secure sockets layer ("SSL") or transport layer security ("TLS") inspection functionalities, or network-based threat detection functionalities.

20. The method of claim 18, wherein the plurality of SASE scriptlets comprises at least one of a SASE scriptlet for deploying a firewall ("FW") at one or more network sites, a SASE scriptlet for configuring a FW at one or more network sites, a SASE scriptlet for deploying and configuring a FW at one or more network sites, a SASE scriptlet for creating and applying a port firewall rule to one or more network sites, a SASE scriptlet for creating and applying a network address translation ("NAT") firewall rule to one or more network sites, a SASE scriptlet for configuring one or more network sites as a software defined wide area network ("SDWAN"), a SASE scriptlet for configuring one or more network sites as a hub of a SDWAN, a SASE scriptlet for configuring one or more network sites as a spoke of a SDWAN, a SASE scriptlet for configuring one or more network sites for SDWAN hub and spoke topology, a SASE scriptlet for configuring one or more network sites as zero trust network access ("ZTNA") gateways, a SASE scriptlet for creating and applying a static route policy for one or more ZTNA gateways, a SASE scriptlet for configuring one or more network sites to enable multicast forwarding functionality, a SASE scriptlet for configuring one or more network sites with rapid threat defense ("RTD") security functionality, a SASE scriptlet for connecting a point-of-service ("POS") device to one or more network sites, a SASE scriptlet for connecting one or more user devices to one or more network sites, or a SASE scriptlet for configuring one or more user devices with direct Internet access ("DIA") functionality.

* * * * *